US006653945B2

(12) United States Patent
Johnson et al.

(10) Patent No.: US 6,653,945 B2
(45) Date of Patent: *Nov. 25, 2003

(54) RADIO COMMUNICATION NETWORK FOR COLLECTING DATA FROM UTILITY METERS

(75) Inventors: Dennis F. Johnson, Winnipeg (CA); Michael Wiebe, Winnipeg (CA); Erwin Holowick, Winnipeg (CA); Nathan R. Jacob, Winnipeg (CA); Michael F. Murhpy, Winnipeg (CA); James J. Schellenberg, Winnipeg (CA); Michael S. Stasenski, Winnipeg (CA)

(73) Assignee: Itron, Inc., Spokane, WA (US)

( * ) Notice: Subject to any disclaimer, the term of this patent is extended or adjusted under 35 U.S.C. 154(b) by 215 days.

This patent is subject to a terminal disclaimer.

(21) Appl. No.: 09/960,800

(22) Filed: Sep. 21, 2001

(65) Prior Publication Data

US 2002/0158774 A1 Oct. 31, 2002

Related U.S. Application Data

(63) Continuation of application No. 09/687,785, filed on Oct. 13, 2000, now Pat. No. 6,373,399, which is a continuation of application No. 09/296,359, filed on Apr. 22, 1999, now Pat. No. 6,172,616, which is a continuation of application No. 08/454,678, filed on May 31, 1995, now Pat. No. 5,963,146, which is a continuation of application No. 08/271,545, filed on Jul. 7, 1994, now Pat. No. 5,553,094, which is a continuation of application No. 08/124,495, filed on Sep. 22, 1993, now abandoned, which is a continuation of application No. 07/732,183, filed on Jul. 19, 1991, now abandoned, which is a continuation-in-part of application No. 07/480,573, filed on Feb. 15, 1990, now Pat. No. 5,056,107.

(51) Int. Cl.$^7$ .............................................. G08C 15/06
(52) U.S. Cl. ............................. 340/870.02; 340/870.11; 370/328
(58) Field of Search ....................... 340/870.02, 870.03, 340/870.11; 370/328

(56) References Cited

U.S. PATENT DOCUMENTS

| 1,987,889 A | 1/1935 | Beverage et al. |
| 3,114,900 A | 12/1963 | Anderson |
| 3,705,385 A | 12/1972 | Batz |

(List continued on next page.)

FOREIGN PATENT DOCUMENTS

| DE | 2205260 | 10/1980 |
| DE | 2060843 | 4/1981 |
| EP | 0244384 | 4/1987 |
| EP | 0263421 | 9/1987 |
| EP | 036342 | 10/1989 |
| EP | 0631266 | 6/1994 |
| WO | 9314585 | 7/1993 |

OTHER PUBLICATIONS

*Spread Spectrum Systems*, by R.C. Dixon (John Wiley & Sons, Inc., 1984); Section 2.3, pp. 42–44.

(List continued on next page.)

*Primary Examiner*—Timothy Edwards
(74) *Attorney, Agent, or Firm*—Patterson, Thuente, Skaar & Christensen, P.A.

(57) ABSTRACT

A radio communications network for transmitting data from a plurality of remote stations to a central station is provided. This system is particularly proposed for automatic meter reading systems in which the remote stations are located at utility meters. The system includes an array of receiving stations arranged relative to the remote stations so that the messages from each remote station can be received by at least two and preferably four of the receiving stations providing a high level of duplication of messages. The remote stations transmit utility usage information obtained from a previous time period at a random time subsequent to the time period so that message collisions can occur. High level of duplication provided by the increased number of receiving stations reduces the message loss. A quiet period during which the remote stations are prevented from transmitting can be used for communication between the receiving stations and the central station.

20 Claims, 12 Drawing Sheets

U.S. PATENT DOCUMENTS

| | | |
|---|---|---|
| 3,786,423 A | 1/1974 | Martell |
| 3,858,212 A | 12/1974 | Tompkins et al. |
| 3,860,872 A | 1/1975 | Richardson et al. |
| 3,944,723 A | 3/1976 | Fong |
| 4,013,962 A | 3/1977 | Beseke et al. |
| 4,040,046 A | 8/1977 | Lang et al. |
| 4,190,800 A | 2/1980 | Kelly, Jr. et al. |
| 4,327,362 A | 4/1982 | Hoss |
| 4,337,466 A | 6/1982 | Spahn |
| 4,361,851 A | 11/1982 | Asip et al. |
| 4,388,690 A | 6/1983 | Lumsden |
| 4,427,968 A | 1/1984 | York |
| 4,495,596 A | 1/1985 | Sciulli |
| 4,589,075 A | 5/1986 | Buenagel |
| 4,597,105 A | 6/1986 | Freeburg |
| 4,661,804 A | 4/1987 | Abel |
| 4,692,761 A | 9/1987 | Robinton |
| 4,707,679 A | 11/1987 | Kennon et al. |
| 4,707,852 A | 11/1987 | Jahr et al. |
| 4,724,435 A | 2/1988 | Moses et al. |
| 4,734,680 A | 3/1988 | Gehman et al. |
| 4,749,992 A | 6/1988 | Fitzemeyer et al. |
| 4,780,910 A | 10/1988 | Huddleston et al. |
| 4,783,623 A | 11/1988 | Edwards et al. |
| 4,799,059 A | 1/1989 | Grindahl et al. |
| 4,804,957 A | 2/1989 | Selph et al. |
| 4,839,642 A | 6/1989 | Batz et al. |
| 4,881,070 A | 11/1989 | Burrowes et al. |
| 4,902,965 A | 2/1990 | Bodrug et al. |
| 4,940,976 A | 7/1990 | Gastouniotis et al. |
| 5,032,833 A | 7/1991 | Laporte |
| 5,038,140 A | 8/1991 | Ikeuchi |
| 5,053,766 A | 10/1991 | Ruiz-del-Portal et al. |
| 5,056,107 A * | 10/1991 | Johnson et al. ........ 340/870.03 |
| 5,067,136 A | 11/1991 | Arthur et al. |
| 5,079,715 A | 1/1992 | Venkataraman et al. |
| 5,276,899 A | 1/1994 | Neches |
| 5,381,136 A | 1/1995 | Johnson et al. |
| 5,490,087 A | 2/1996 | Redden et al. |
| 5,504,896 A | 4/1996 | Schell et al. |
| 5,553,094 A | 9/1996 | Powers et al. |
| 5,696,501 A | 12/1997 | Ouellette et al. |
| 5,963,146 A | 10/1999 | Johnson et al. |
| 6,373,399 B1 * | 4/2002 | Johnson et al. ........ 340/870.02 |

OTHER PUBLICATIONS

*Computer Networks,* Andrew S. Tanenbaum, Satellite Packet Broadcasting, Prentice Hall, 1981, pp. 253–257.
*System Schematic,* DataBeam, Jul. 1986.
*Broadcast Radio System for Distribution Communications,* L. Martinez, Altran Electronics, Inc., Copyright 1981 Electrical Power Research Institute.
*Communication Systems for Distribution Automation and Load Management,* W.E. Lair, V.T. Rhyne, Results of EPRI/DOE Research, Jul. 1982.
*Automatic Meter Reading and Remote Loading Monitoring Business Plan,* DataBeam.
DataBeam Product Line Brochure, Mar. 3, 1987.

* cited by examiner

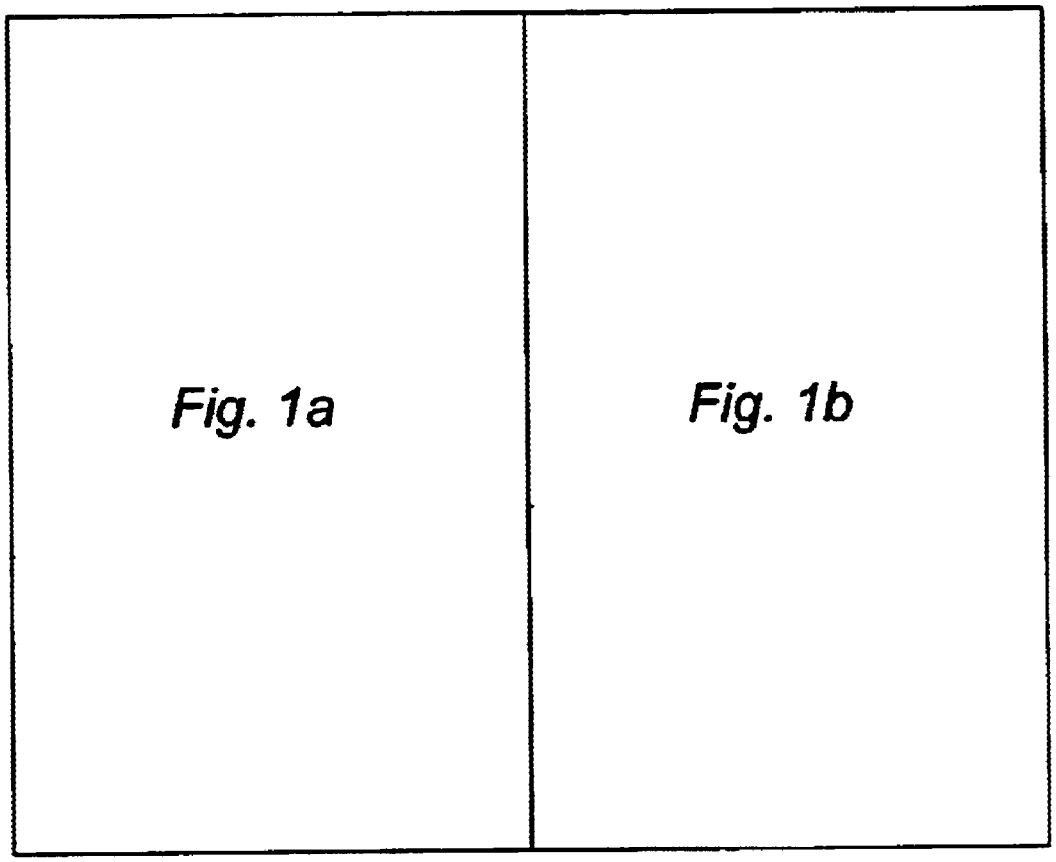

RADIO COMMUNICATION NETWORK FOR COLLECTING DATA FROM UTILITY METERS

RELATED PATENTS

This application is a continuation of U.S. application Ser. No. 09/687,785, filed Oct. 13, 2000, now U.S. Pat. No. 6,373,399 entitled WIDE AREA COMMUNICATION NETWORK FOR REMOTE DATA GENERATING STATIONS which is a continuation of U.S. application Ser. No. 09/296,359, filed Apr. 22, 1999, now U.S. Pat. No. 6,172,616 entitled WIDE AREA COMMUNICATIONS NETWORK FOR REMOTE DATA GENERATING STATIONS, which is a continuation of U.S. application Ser. No. 08/454,678, filed May 31, 1995, now U.S. Pat. No. 5,963,146 entitled WIDE AREA COMMUNICATIONS NETWORK FOR REMOTE DATA GENERATING STATIONS, which is a continuation of U.S. application Ser. No. 08/271,545, filed Jul. 7, 1994, now U.S. Pat. No. 5,553,094 entitled, RADIO COMMUNICATION NETWORK FOR REMOTE DATA GENERATING STATIONS, which is a file wrapper continuation application of U.S. application Ser. No. 08/124,495, filed Sep. 22, 1993, now abandoned entitled RADIO COMMUNICATION NETWORK FOR REMOTE DATA GENERATING STATIONS, which is a file wrapper continuation application of U.S. application Ser. No. 07/732,183, filed Jul. 19, 1991, abandoned entitled RADIO COMMUNICATION NETWORK FOR REMOTE DATA GENERATING STATIONS, which is a continuation-in-part of U.S. application Ser. No. 07/480,573, filed Feb. 15, 1990, now U.S. Pat. No. 5,056,107, which issued on Oct. 8, 1991, entitled RADIO COMMUNICATION NETWORK FOR REMOTE DATA GENERATING STATIONS. The benefit of the earlier filing dates of the parent patent applications is claimed pursuant to 35 U.S.C. §120.

BACKGROUND OF THE INVENTION

This invention relates to a communications network for collecting data from remote data generating stations, and more particularly a radio based system for sending data from a plurality of network service modules, with each network service module attached to a meter, and communicating through remote cell nodes and through intermediate data terminals, to a central data terminal.

DESCRIPTION OF THE RELEVANT ART

Many attempts have been made in recent years to develop an automatic meter reading system for utility meters such as used for electricity, gas and water, which avoids meter reading personnel inspecting and physically noting the meter readings. There are, of course, many reasons for attempting to develop a system of this type.

Most of the prior art systems have achieved little success. The system, which has achieved some success or is most widely used has an automatic meter reading unit mounted on an existing meter at the usage site and includes a relatively small transmitter and receiver unit of very short range. The unit is polled on a regular basis by a traveling reading unit, which is carried around the various locations on a suitable vehicle. The traveling reading unit polls each automatic meter reading unit in turn to obtain stored data. This approach is of limited value in that it requires transporting the equipment around the various locations and, hence, only very infrequent, for example monthly, readings can be made. The approach avoids a meter reader person actually entering the premises to physically inspect the meter which is of itself of some value but only limited value.

Alternative proposals in which reading from a central location is carried out have been made but have achieved little success. One proposal involves an arrangement in which communication is carried out using the power transmission line of the electric utility. Communication is, therefore, carried out along the line and polls each remote reading unit in return. This device has encountered significant technical difficulties.

Another alternative attempted to use the pre-existing telephone lines for communication. The telephone line proposal has a significant disadvantage since it must involve a number of other parties, in particular the telephone company, for implementing the system. The utility companies are reluctant to use a system which cannot be entirely controlled and managed by them.

A yet further system using radio communication has been developed by Data Beam, which was a subsidiary of Connecticut Natural Gas. This arrangement was developed approximately in 1986 and has subsequently received little attention and it is believed that no installations are presently operative. The system includes a meter reading device mounted on the meter with a transmitting antenna which is separate from the meter reading device. The transmitting antenna is located on the building or other part of the installation site which enables the antenna to transmit over a relatively large distance. The system uses a number of receiving units with each arranged to receive data from a large number of transmitters, in the range of 10,000 to 30,000. The transmitters, in order to achieve maximum range, are positioned to some extent directionally or at least on a suitable position of the building to transmit to the intended receiving station. This arrangement leads to using a minimum number of receiving stations for optimum cost efficiency.

The separate transmitter antenna, however, generated significant installation problems due to wiring the antenna through the building to the transmitter and receiver. The anticipated high level of power used for transmitting involved very expensive battery systems or very expensive wiring. The proposal to reduce the excessive cost was to share the transmission unit with several utilities serving the building so that the cost of the transmitter could be spread, for example, between three utilities supplied to the building. Such installation requires separate utility companies to cooperate in the installation. While this might be highly desirable, such cooperation is difficult to achieve on a practical basis.

In order to avoid timing problems, the meter reading units were arranged to communicate on a random time basis. However, the very large number, up to 30,000, of meter reading units reporting to a single receiving station, leads to a very high number of possible collisions between the randomly transmitted signals. The system, therefore, as proposed, with daily or more often reporting signals could lose as many as 20% to 50% of the signals transmitted due to collisions or interference which leads to a very low efficiency data communication. The use of transmitters at the meter reading units which are of maximum power requires a larger interference protection radius between systems using the same allocated frequency.

An alternative radio transmission network is known as ALOHA. ALOHA has a number of broadcasting stations communicating with a single receiving station, with the broadcasting stations transmitting at random intervals. In the ALOHA system, collisions occur so that messages are lost. The solution to this problem is to monitor the retransmission of the information from the receiving station so that each broadcasting station is aware when its transmission has been lost. Each broadcasting station is then programmed to retransmit the lost information after a predetermined generally pseudorandom period of time. The ALOHA system requires retransmission of the information from the receiving station to take place substantially immediately and requires each broadcasting station to also have a receiving capability.

Cellular telephone networks are implemented on a wide scale. Cellular systems, however, use and allocate different frequencies to different remote stations. While this is acceptable in a high margin use for voice communications, the costs and complications cannot be accepted in the relatively lower margin use for remote station monitoring. The technology of cellular telephones leads to the perception in the art that devices of this type must use different frequency networks.

While theoretically automatic meter reading is highly desirable, it is, of course, highly price sensitive and hence it is most important for any system to be adopted for the price per unit of particularly the large number of meter reading units to be kept to a minimum. The high cost of high power transmission devices, receiving devices, and battery systems generally leads to a per unit cost which is unacceptably high.

OBJECTS OF THE INVENTION

A general object of the invention is a communications network for communicating data from a plurality of network service modules to a central data terminal.

Another object of the invention is a communications network which is suitable for an automatic meter reading system.

A further object of the invention is a communications network for collecting data from remote data generating stations that is simple and economic to install and maintain.

A still further object of the invention is a communications network for collecting data from network service modules that is spectrum efficient, and has inherent communication redundancy to enhance reliability and reduce operating costs.

An additional object of the invention is an open architecture communication network which accommodates new technology, and allows the network operator to serve an arbitrarily large contiguous or non-contiguous geographic area.

SUMMARY OF THE INVENTION

According to the present invention, as embodied and broadly described herein, a wide area communications network is provided for sending data from a plurality of network service modules to a central data terminal. The wide area communications network collects NSM data generated by a plurality of physical devices located within a geographical area. The physical devices may be, for example, a utility meter as used for electricity, gas or water. The wide area communications network comprises a plurality of network service modules, a plurality of remote cell nodes, a plurality of intermediate data terminals, and a central data terminal. Each network service module is coupled to a respective physical device.

The network service module (NSM) includes NSM-receiver means, NSM-transmitter means, and NSM-processor means, NSM-memory means and an antenna. The NSM-receiver means, which is optional, receives a command signal at a first carrier frequency or a second carrier frequency. In a preferred mode of operation, the NSM-receiver means receives the command signal on the first carrier frequency for spectrum efficiency. The wide area communications network can operate using only a single carrier frequency, i.e., the first carrier frequency. The command signal allows the oscillator of the NSM-transmitting means to lock onto the frequency of the remote cell node, correcting for drift. Signaling data also may be sent from the remote cell node to the network service module using the command signal.

The NSM-processor means arranges data from the physical device into packets of data, transfers the data to the NSM-memory means, and uses the received command signal for adjusting the first carrier frequency of the NSM transmitter. The NSM data may include meter readings, time of use and other information or status from a plurality of sensors. The NSM-processor means, for all network service modules throughout a geographical area, can be programmed to read all the corresponding utility meters or other devices being serviced by the network service modules. The NSM-processor means also can be programmed to read peak consumption at predetermined intervals, such as every 15 minutes, throughout a time period, such as a day. The NSM-memory means stores NSM data from the physical device. The NSM-processor means can be programmed to track and store maximum and minimum sensor readings or levels throughout the time period, such as a day.

The NSM-transmitter means transmits at the first carrier frequency the respective NSM data from the physical device as an NSM-packet signal. The NSM-packet signal is transmitted at a time which is randomly or pseudorandomly selected within a predetermined time period, i.e., using a one-way-random-access protocol, by the NSM-processor means. The NSM-transmitter includes a synthesizer or equivalent circuitry for controlling its transmitter carrier frequency. The NSM-transmitter means is connected to the antenna for transmitting multi-directionally the NSM-packet signals.

A plurality of remote cell nodes are located within the geographical area and are spaced approximately uniformly, such that each network service module is within a range of several remote cell nodes, and so that each remote cell node can receive NSM-packet signals from a plurality of network service modules. The remote cell nodes preferably are spaced such that each of the network service modules can be received by at least two remote cell nodes. Each remote cell node (RCN) includes RCN-transmitter means, RCN-receiver means, RCN-memory means, RCN-processor means, and an antenna. The RCN-transmitter means transmits at the first carrier frequency or the second carrier frequency, the command signal with signaling data. Transmitting a command signal from the RCN-transmitter means is optional, and is used only if the NSM-receiver means is used at the network service module as previously discussed.

The RCN-receiver means receives at the first carrier frequency a multiplicity of NSM-packet signals transmitted from a multiplicity of network service modules. Each of the NSM-packet signals typically are received at different points in time, since they were transmitted at a time which was randomly or pseudorandomly selected within the predetermined time period. The multiplicity of network service modules typically is a subset of the plurality of network service modules. The RCN-receiver means also receives polling signals from the intermediate data terminal, and listens or eavesdrops on neighboring remote cell nodes when they are polled by the intermediate data terminal.

The RCN-memory means stores the received multiplicity of NSM-packet signals. The RCN-processor means collates the NSM-packet signals received from the network service modules, identifies duplicates of NSM-packet signals, and deletes the duplicate NSM-packet signals. When a polling signal is sent from an intermediate data terminal (IDT), the RCN-transmitter means transmits at the first carrier frequency the stored multiplicity of NSM-packet signals as an RCN-packet signal.

When a first remote cell node is polled with a first polling signal by the intermediate data terminal, neighboring remote cell nodes receive the RCN-packet signal transmitted by the first remote cell node. Upon receiving an acknowledgment signal from the intermediate data terminal, at the neighboring remote cell nodes, the respective RCN-processor means deletes from the respective RCN-memory means messages, i.e., NSM-packet signals, received from the network service modules that have the same message identification number as messages transmitted in the RCN-packet signal from the first remote cell node to the intermediate data terminal.

The plurality of intermediate data terminals are located within the geographic area and are spaced to form a grid overlaying the geographic area. Each intermediate data terminal includes IDT-transmitter means, IDT-memory means, IDT-processor means and IDT-receiver means. The IDT-transmitter means includes a synthesizer or equivalent circuitry for controlling the carrier frequency, and allowing the IDT-transmitter means to change carrier frequency. The IDT-transmitter means transmits preferably at the first carrier frequency, or the second carrier frequency, the first polling signal using a first polling-access protocol to the plurality of remote cell nodes. When the first polling signal is received by a remote cell node, that remote cell node responds by sending the RCN-packet signal to the intermediate data terminal which sent the polling signal. If the intermediate data terminal successfully receives the RCN-packet-signal, then the IDT-transmitter means sends an acknowledgment signal to the remote cell node.

The IDT-receiver means receives the RCN-packet signal transmitted at the first carrier frequency from the remote cell node which was polled. Thus, after polling a plurality of remote cell nodes, the IDT-receiver means has received a plurality of RCN-packet signals.

The IDT-memory means stores the received RCN-packet signals. The IDT-processor means collates the NSM-packet signals embedded in the RCN-packet signals received from the plurality of remote cell nodes, identifies duplicates of NSM-packet signals and deletes the duplicate NSM-packet signals, i.e., messages from network service modules that have the same message identification number. In response to a second polling signal from a central data terminal, the IDT-transmitter means transmits a plurality of RCN-packet signals as an IDT-packet signal to the central data terminal.

The central data terminal (CDT) includes CDT-transmitter means, CDT-receiver means, CDT-processor means and CDT-memory means. The CDT-transmitter means transmits sequentially the second polling signal using a second polling access protocol to each of the intermediate data terminals. The CDT-receiver means receives a plurality of IDT-packet signals. The central data terminal, intermediate data terminals and the remote cell nodes may be coupled through radio channels, telephone channels, fiber optic channels, cable channels, or other communications medium. The CDT-processor means decodes the plurality of IDT-packet signals as a plurality of NSM data. The CDT-processor means also identifies duplicates of NSM data and deletes the duplicate NSM data. The CDT-memory means stores the NSM data in a data base.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1A:
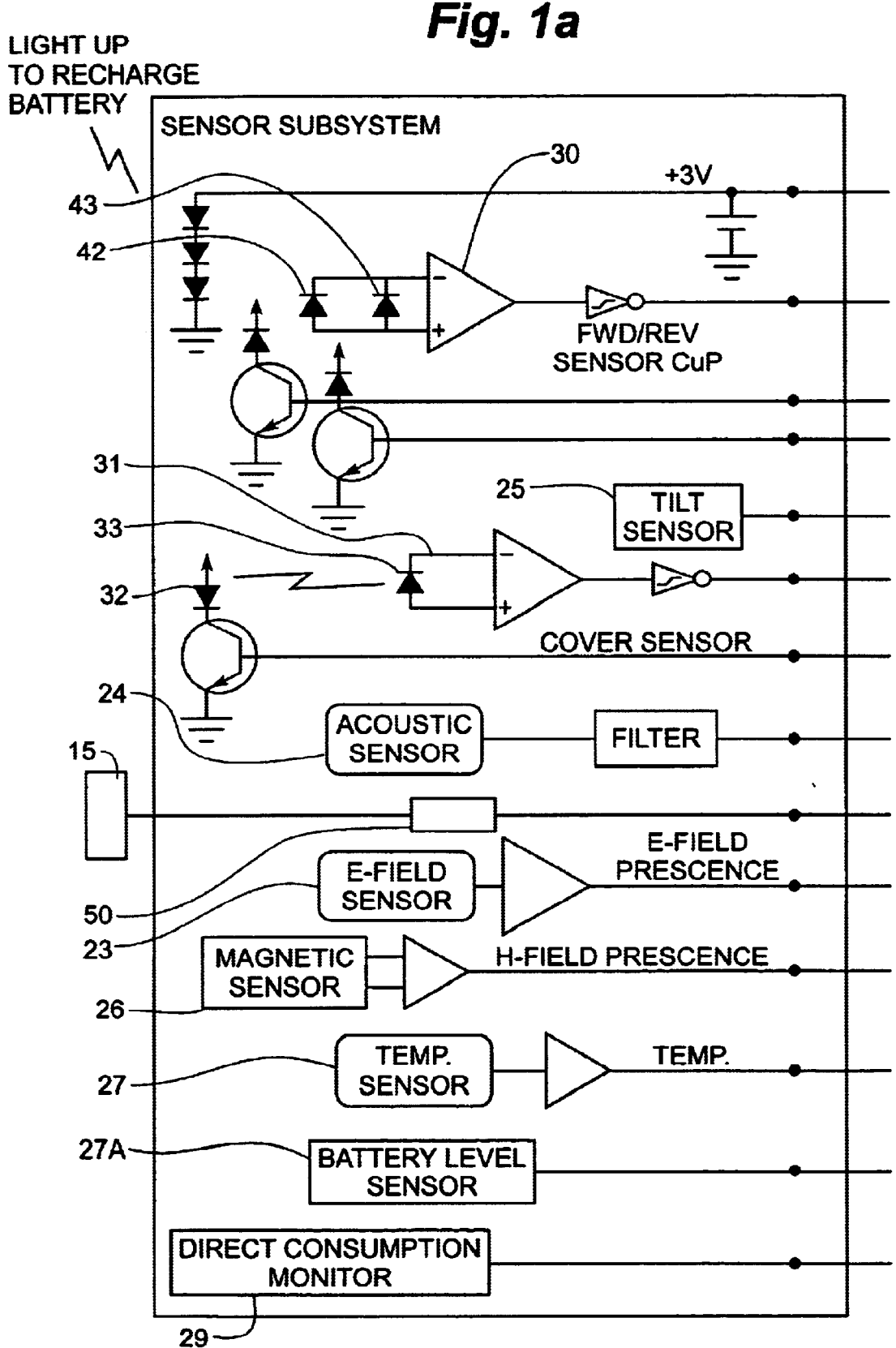
FIG. 1 illustrates the hierarchial communications network topology.

Reference will now be made in detail to the present preferred embodiments of the invention, examples of which are illustrated in the accompanying drawings, wherein like reference numerals indicate like elements throughout the several views.

Figure 1B:
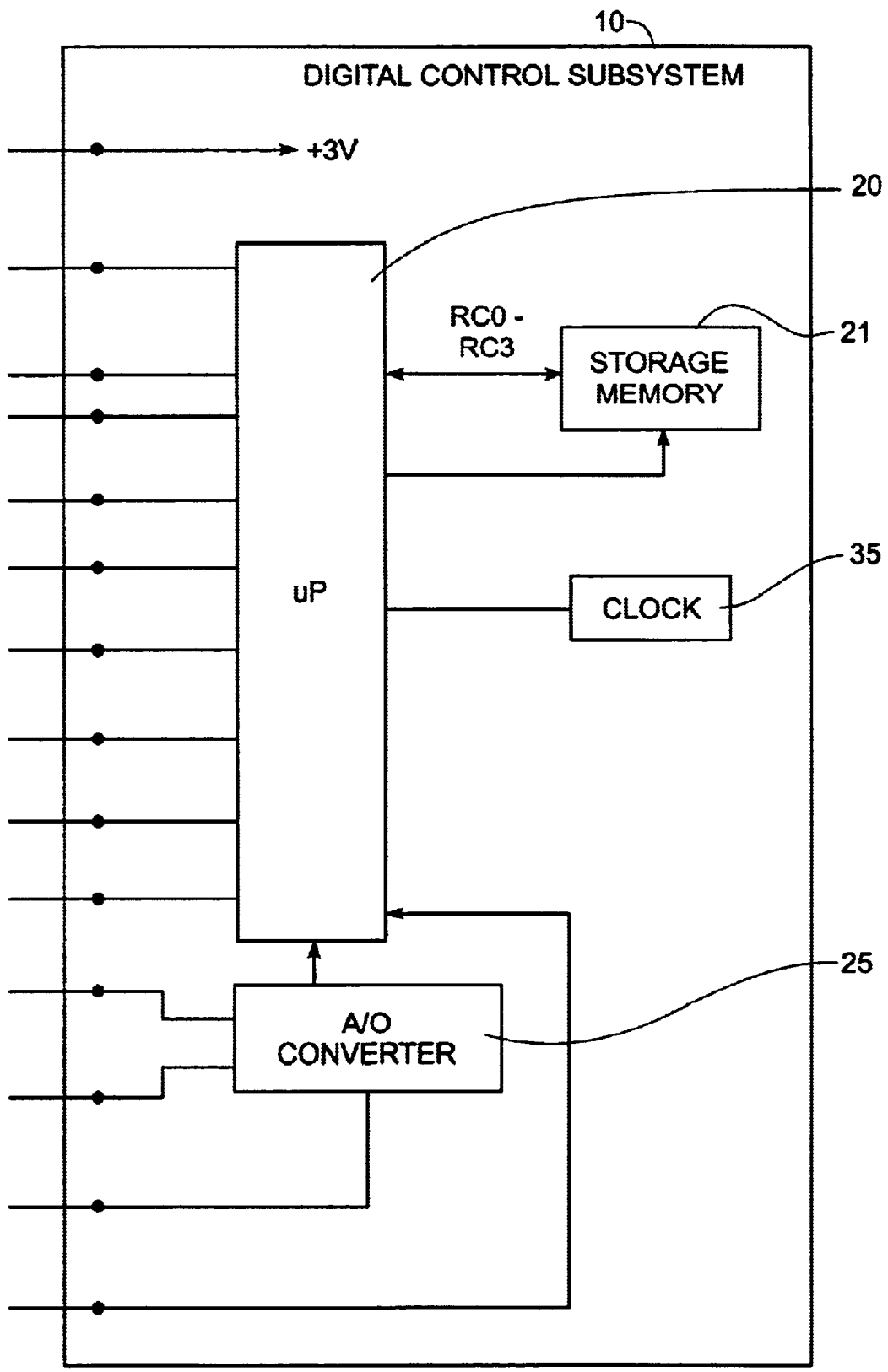

A wide area communications network communicates data from a plurality of network service modules to a central data terminal. The wide area communications network collects NSM data generated by a plurality of physical devices located within a geographical area. The wide area communications network, as illustratively shown in FIG. 1, is a layered network having a hierarchial communications topology comprising a plurality of network service modules 110, a plurality of remote cell nodes 112, a plurality of intermediate data terminals 114, and a central data terminal 120. The physical devices may be, for example, a utility meter as used for electricity, gas or water.

The central data terminal controls network operation. Intelligence exists at all layers of the network, thereby easing the workload of the central data terminal. The intelligence attributed to each module is a function of the application of that module.

Network Service Module

Information is acquired at the lowest level of the wide area communications network of FIG. 1, and the network service module 110 performs the data acquisition functions. Network service modules 110 include meter service modules for electricity, gas and water, a service disconnect module, a load management module, an alarm monitoring module, or any other module that can be used with the wide area communications network.

The network service modules 110 are linked to the wide area communications network via high frequency radio channels, typically in the 928 MHz–952 MHz band, as well as related frequencies in the 902 MHz–912 MHz, and 918 MHz–928 MHz bands. Radio channels in these bands are the preferred communications medium because use of radio communications eliminates the need for physical connections to the service modules which drastically reduces installation costs compared to other communication media such as telephone, cable networks and power line carriers. Also, operation in the high frequency bands permits the use of small antennas so that retrofitting standard watt hour meters is simplified. Radio communication channels in other bands may work equally as well, however.

Figure 2:
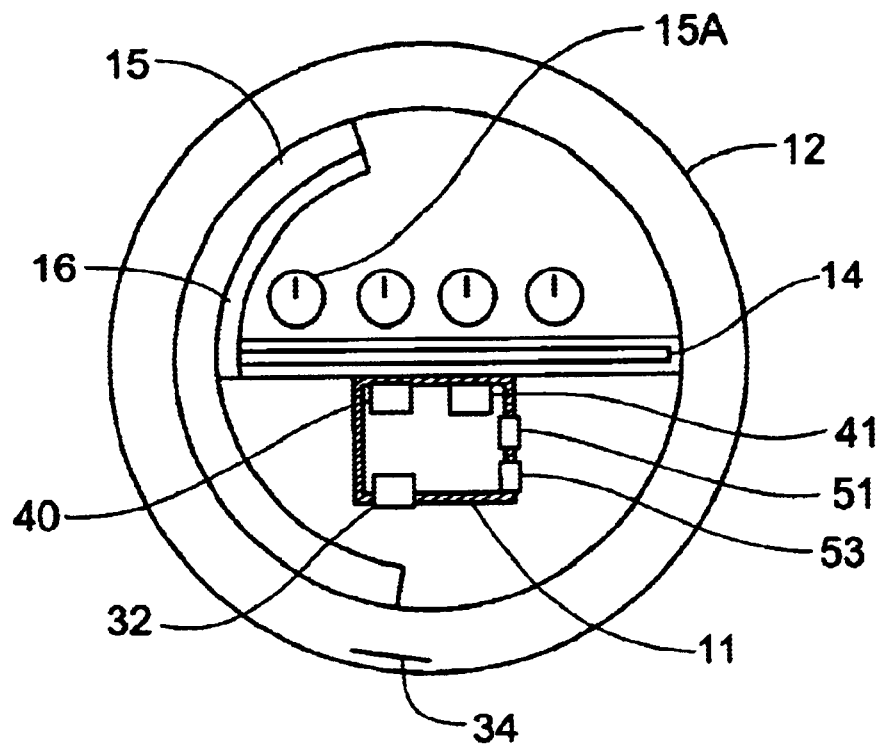
FIG. 2 is a network service module block diagram.

In the exemplary arrangement shown in FIG. 2, the network service module (NSM) 110 includes NSM-receiver means, NSM-transmitter means, NSM-processor means, NSM-memory means, and an NSM antenna 322. The NSM-transmitter means and the NSM-receiver means are coupled to the NSM antenna 322. The NSM-processor means is coupled to the NSM-transmitter means, NSM-receiver means, NSM-memory means, and the physical device. The physical device is shown as basic 320 and other sensors 322, and application control interface 324. The network service module also includes an AC power supply 310 and a back-up battery power supply 312.

The NSM-receiver means is embodied as an NSM receiver 316, and is optional. If an NSM receiver 316 is included with the network service module, then the NSM receiver 316 can be used for receiving a command signal, which includes signaling data. The command signal can be transmitted at either a first carrier frequency or a second carrier frequency. Normally, the first carrier frequency is used by the NSM-transmitter means for transmitting to a remote cell node. In a preferred embodiment, the NSM receiver 316 receives the command signal on the first carrier frequency for spectrum efficiency. Thus, the wide area communications network can operate using only a single carrier frequency, i.e., the first carrier frequency. The command signal can provide a time reference for updating a local clock, and serve as a frequency reference to the network service module. Signaling data, such as manage service disconnect or control loads, also may be sent from the remote cell node to the network service module using the command signal. While the network service modules could be polled by the command signal, in general, such polling is not required and preferably not used with the present invention.

The NSM-processor means, which is embodied as an NSM controller 314, arranges data from the physical device into packets of data, and transfers the data to the NSM-memory means which is embodied as an NSM memory 315. The NSM controller 314 may be a microprocessor or equivalent circuit for performing the required functions. The NSM controller 314 uses the received command signal for adjusting and setting the first carrier frequency of the NSM transmitter. The NSM data may include meter readings, time of use and other information or status from a plurality of sensors. The NSM controllers 314, for each network service module throughout a geographical area, can be programmed to read all the corresponding utility meters or other devices being serviced by the network service module, respectively. The NSM controller 314 can be programmed to read peak consumption at predetermined intervals, such as every 15 minutes, throughout a time period, such as a day. The NSM controller 314 also can be programmed to track and store maximum and minimum sensor readings or levels throughout the time period, such as a day.

The NSM memory 315 stores NSM data from the physical device. NSM data may include meter reading data and time of use (TOU) and other information or status from a plurality of sensors. The NSM memory 315 may be random access memory (RAM) or any type of magnetic media or other memory storage devices known in the art. The NSM controller 314 uses the received command signal for adjusting the first carrier frequency of the NSM transmitter 318.

Figure 3:
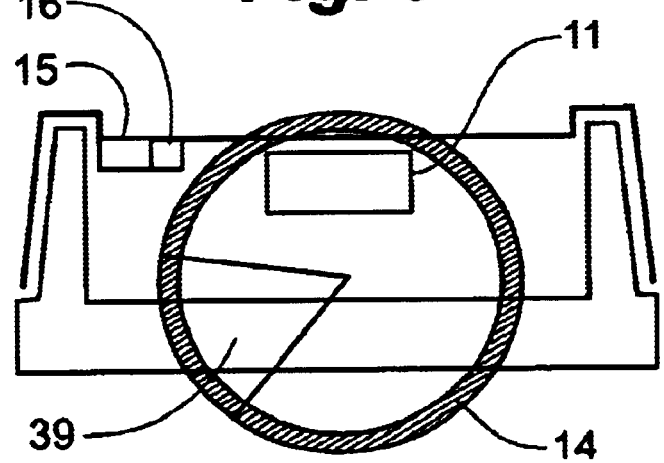
FIG. 3 is a representative NSM-data packet.

The NSM-transmitter means is embodied as an NSM transmitter 318. The NSM transmitter 318 transmits at a first carrier frequency the respective NSM data from the physical device in brief message packets called an NSM-packet signal. The NSM-packet signal might have a time duration of 100 milliseconds, although any time duration can be used to meet particular system requirements. The NSM-packet signal transmitted by the NSM transmitter 318 follows a generic or fixed format, and a representative message packet is illustrated in FIG. 3. Included in the message is: preamble; opening frame; message type; message identification; of service module type; message number; service module address; data field; error detection; and closing frame.

The NSM transmitter 318 is connected to an NSM antenna 322 for transmitting multi-directionally the NSM-packet signals. The NSM transmitter 318 includes a synthesizer or equivalent circuitry for controlling its transmitter carrier frequency and schedule.

The NSM-packet signal is transmitted at a time which is randomly or pseudorandomly selected within a predetermined time period, i.e., using a one-way-random-access protocol, by the NSM-processor means. In order to simplify network operation and reduce costs, the wide area communications network does not poll individual network service modules. Rather, each network service module reports autonomously at a rate appropriate for the application being supported. Routine reports are therefore transmitted randomly or pseudorandomly at fixed average intervals, while alarm signals are transmitted immediately following detection of alarm conditions. Alarm signals may be transmitted several times with random delays. This avoids interference among alarm messages if many alarms occur simultaneously, as in an area-wide power outage.

As an alternative arrangement, the network service module may be programmed to transmit three different types of messages at different intervals. The first type of message can relate to the accumulated usage information. The second type of message can relate to an alarm condition which is basically transmitted immediately. The alarm conditions that occur might relate to a tamper action or to the absence of electrical voltage indicative of a power failure. The third type of information which may be transmitted less frequently can relate to the housekeeping information.

After preparing the packet of data for transmission, the controller 314 is arranged to hold the data packet for a random period of time. This random period can be calculated using various randomizing techniques including, for example, a psuedo-random sequence followed, for example, by an actual random calculation based upon the rotation of the metering disk at any particular instant. In this way each of the network service modules is arranged to transmit at a random time. The controller 314 is arranged so that the transmission does not occur within a particular predetermined quiet time so that none of the network service modules is allowed to transmit during this quiet time. This quiet time could be set as one hour in every eight hour period. In this way after an eight hour period has elapsed, each of the network service modules would transmit at a random time during the subsequent seven hours followed by a quiet one hour.

Network capacity or throughput is limited by the probability of message collisions at each remote cell node 112. Because all network service modules 110 share a single carrier channel and transmit at random times, it is possible for several network service modules 110 within a range of a particular remote cell node 112 to transmit simultaneously and to collide at the remote cell node. If the received signal levels are comparable, the overlapping messages will mutually interfere, causing receive errors and both messages will be lost. However, if one signal is substantially stronger than the other, the stronger signal will be successfully received. Moreover, since both signals are received by at least two and preferably four of the remote cell nodes, the probability of both messages being received is fairly high unless the network service modules are in close spatial proximity. During an interval T, each transmitter within a cell surrounding a single remote cell node sends a single randomly timed message of duration M to several potential receive stations.

N = no. of transmitters/cell
M = message duration (seconds)
T = message interval
$P_C$ = probability of collision
$P_S$ = probability of no collision Once any Transmitter, $T_i$, starts transmitting the probability that another particular transmitter, $T_j$, will complete or start another transmission is $$\frac{2M}{T}$$

The probability that there will be no collision is $$1 - \frac{2M}{T}.$$

If there are N-1 other transmitters the probability of no collision, $P_S$, is given by $$P_s = \left(1 - \frac{2M)^{N-1}}{T}\right)$$

$$P_s = \left(1 - \frac{2M)^N}{T}\right)$$

For a given Transmitter, $T_i$, the probability of a collision occurring during the interval T is $$P_c = 1 - P_s = 1 - \left(1 - \frac{2M)^N}{T}\right)$$

The probability of collisions occurring on successive tries is $$P_{cn} = (P_c)^{An}$$

For M=0.3 Sec T=8 hrs.=28.8×10³ secs.

$$P_s = (1 - \frac{2M)^N}{T} \ 1 - 2.08 \times 10^{-5} = (.999979)^N$$

| N | Ps | Pc1 | Pc2 | Pc3 |
|---|------|-------|----------------------|----------------------|
| 100 | .9979 | .0021 | 4 × 10⁻⁶ | 8 × 10⁻⁹ |
| 200 | .9958 | .0042 | 1.6 × 10⁻⁵ | 6.4 × 10⁻⁸ |

-continued $$P_s = (1 - \frac{2M)^N}{T} \ 1 - 2.08 \times 10^{-5} = (.999979)^N$$

| N | Ps | Pc1 | Pc2 | Pc3 |
|---|------|-------|----------------------|----------------------|
| 500 | .9896 | .0104 | 10⁻⁴ | 10⁻⁶ |
| 1,000 | .9794 | .0206 | 4 × 10⁻⁴ | 8 × 10⁻⁶ |
| 2,000 | .9591 | .041 | 1.6 × 10⁻³ | 6.8 × 10⁻⁵ |
| 5,000 | .9010 | .099 | 9.8 × 10⁻³ | 9.7 × 10⁻⁴ |
| 10,000 | .811 | .189 | 3.5 × 10⁻² | 6.7 × 10⁻³ |

From the viewpoint of a remote cell node, the number of transmitters, $N_T$, whose signal level exceeds the receiver noise level and can, therefore, be received reliably depends on:

(a) the density of transmitters;
(b) transmit power level;
(c) propagation pathloss;
(d) background noise.

Propagation pathloss is highly variable due to attenuation, reflection, refraction and scattering phenomena which are a function of terrain, building structures, and antenna location. Some of these parameters can even vary on a diurnal and seasonal basis.

In estimating network performance however, the simple message collision model is not completely accurate because:

1. random noise bursts from various sources can obscure messages which do not collide;
2. some colliding message signals will be of sufficiently different amplitude that the stronger signal will still be received correctly.

A statistical model can be developed to provide data by which determination can be made of the best location and number of remote cell nodes for a particular geographical location. Thus, the model can include data relating to house density the N- value defined above relating to the attenuation of the signal, the location and presence of trees.

Figure 4:
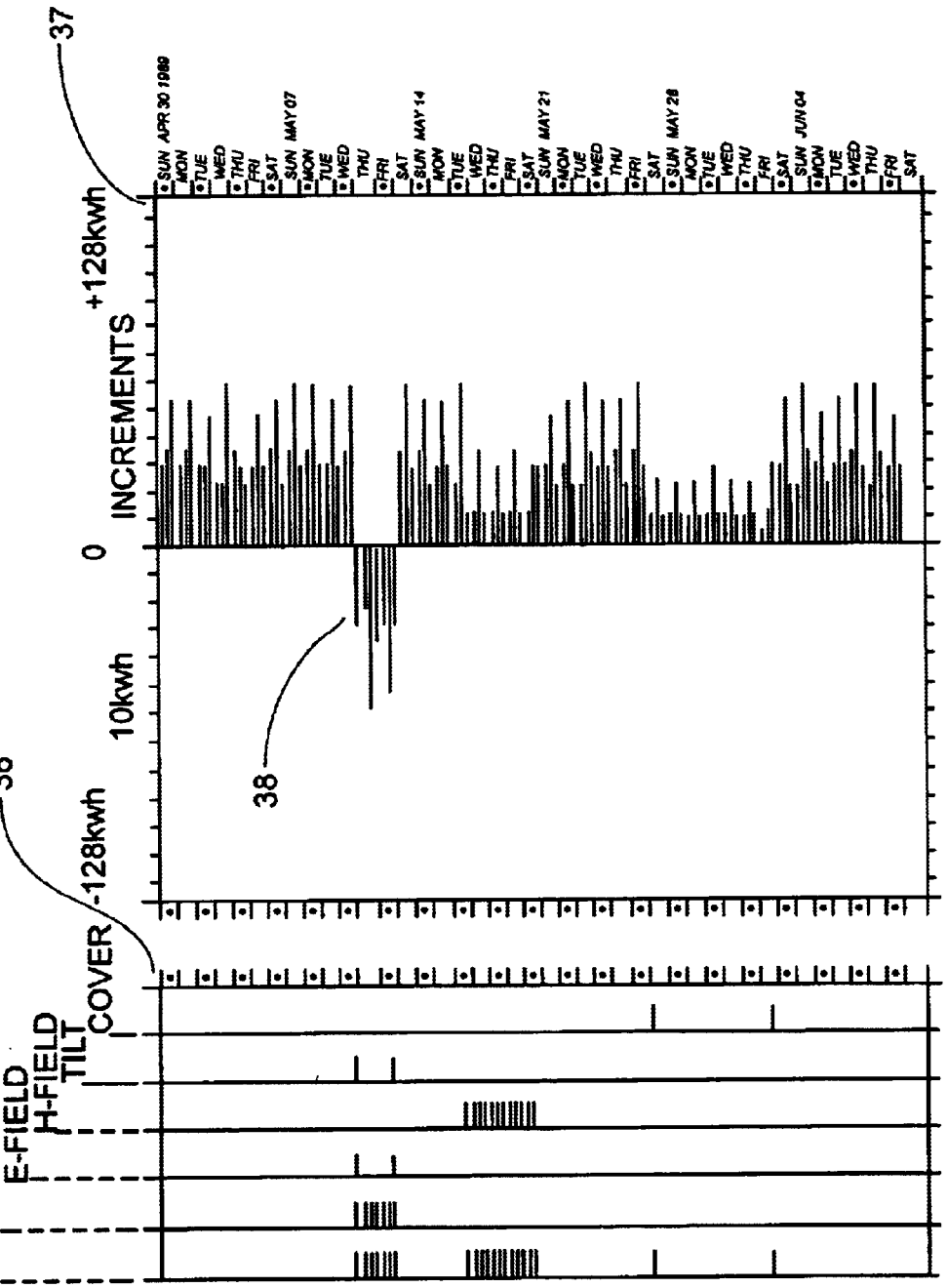
FIG. 4 is a listing of representative applications supported by the communications network.

FIG. 4 is an illustrative listing of applications supported by the network service module within the wide area communications network. The following is a detailed discussion of the electricity meter application.

Network Service Module With an Electricity Meter

Figure 5:
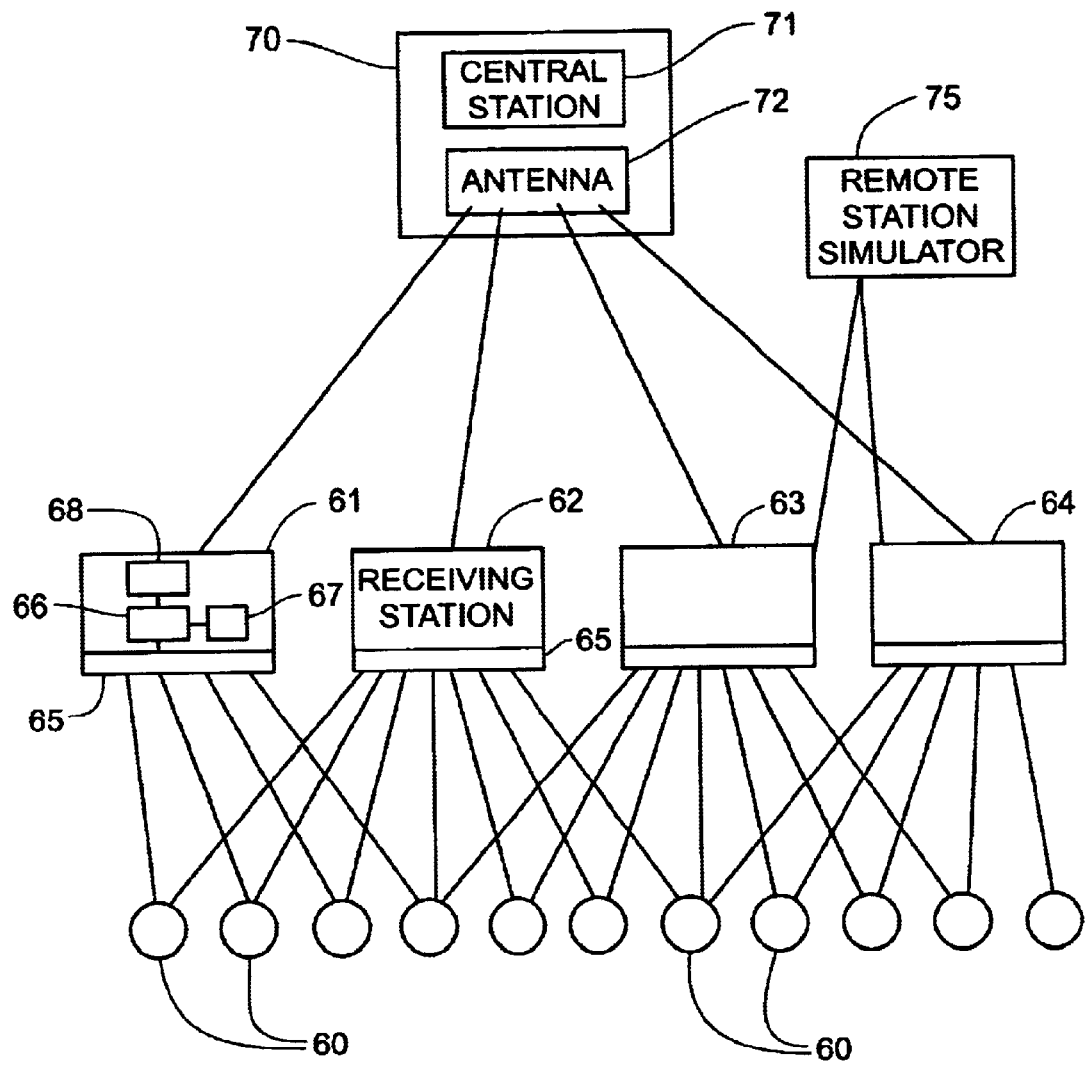
FIG. 5 is a schematic diagram of a network service module.
Figure 6:
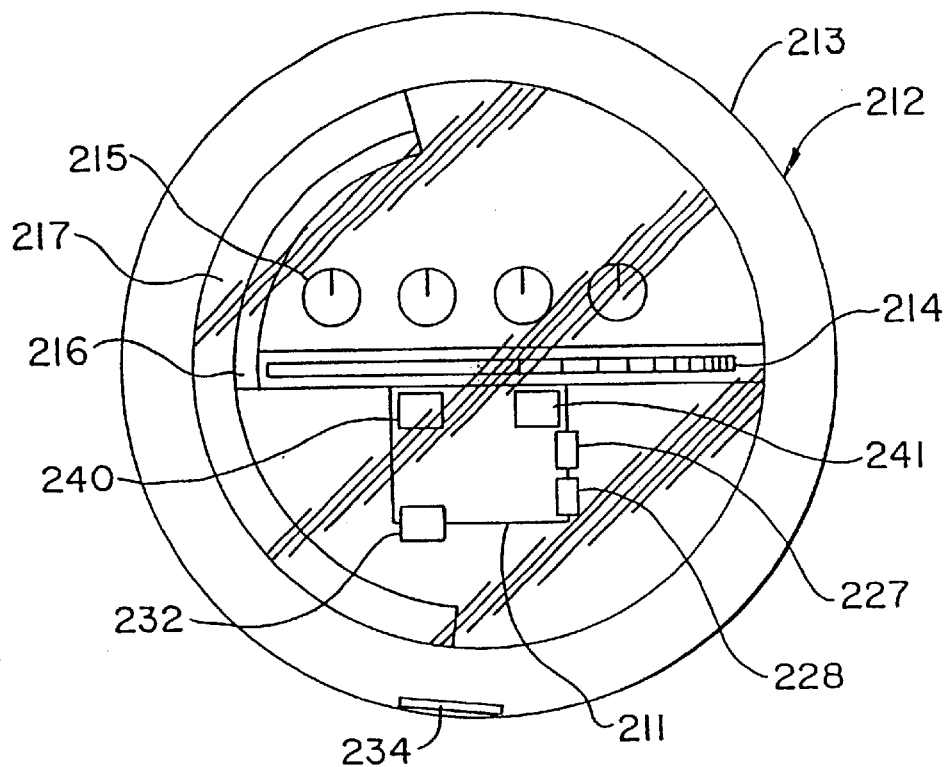
FIG. 6 shows a front elevation view of an electricity utility meter with a detection unit.
Figure 7:
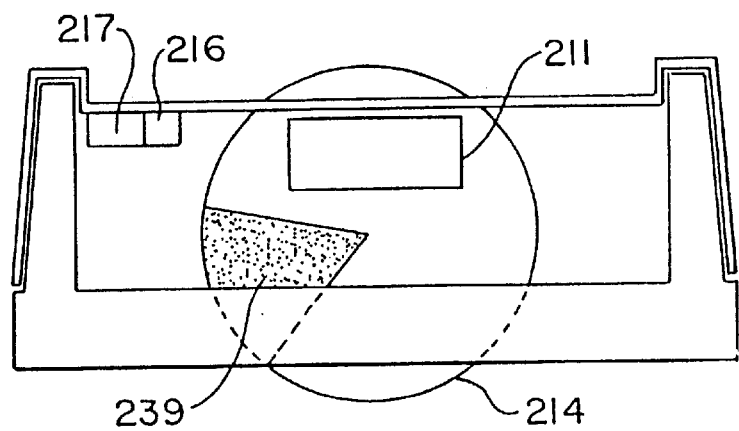
FIG. 7 shows a bottom plan view of the electricity utility meter.

A network service module 110 schematically is shown in FIG. 5 and is mounted in a suitable housing 211 illustrated in FIGS. 6 and 7 with the housing including suitable mounting arrangement for attachment of the housing into the interior of a conventional electricity meter 212. Each network service module is coupled to a respective physical device. In FIG. 6, the physical device is an electricity meter 212.

Referring to FIGS. 5, 6, and 7, the electricity meter 212 includes an outer casing 213 which is generally transparent. Within the casing is provided the meter system which includes a disk 214 which rotates about a vertical axis and is driven at a rate dependent upon the current drawn to the facility. The numbers of turns of the disk 214 are counted by a counting system including mechanical dials 215. The meter is of conventional construction and various different designs are well known in the art.

An antenna 217 is mounted on a bracket 216 carried on the housing inside the cover 213. The antenna 217, as shown, is arc-shaped extending around the periphery of the front face. Other antenna configurations are possible.

As illustrated in FIG. 6, the antenna 217 is mounted within the cover 213 of the meter. Thus the NSM antenna 217 is mounted on the support structure itself of the network service module 110. This enables the network service module 110 to be manufactured relatively cheaply as an integral device which can be installed simply in one action. However, this provides an NSM antenna 217 which can transmit only relatively short distances. In addition, the power level is maintained in relatively low value of the order of 10–100 milliwatts, the energy for which can be provided by a smaller battery system which is relatively inexpensive. An NSM antenna 217 of this type transmitting at the above power level would have a range of the order of one to two kilometers.

The network service module 110 is in a sealed housing which prevents tampering with the sensors, microprocessor 220, and memory 221 located within the housing 211.

Turning now to FIG. 5, the network service module optionally may include a detection device which uses the microprocessor 220 which has associated therewith a storage memory 221. An essential sensor is for meter reading, for measuring the amount of electricity, amount of water, or amount of gas consumed. Such a sensor alleviates having a meter reader person by allowing the system to automatically report the amount of usage of the physical device.

Any number of sensors may be provided for detection of tampering events with the network service module of the present invention, and the sensors may be adapted for electricity, gas, water, or other applications. For the most part, information reported by the various sensors would be considered low data rate. The wide area communications network supports distributed automation functions including basic meter reading, time of use meter reading, service connect, and disconnect operations, alarm reporting, theft of service reporting, load research, residential load control, commercial and industrial load curtailment, and distributed supervisory control and data acquisition (SCADA). Furthermore, the wide area communications network is readily expandable to support new applications as they are developed.

While the emphasis, by way of example, is automatic meter reading and on measuring time of use of an electricity meter, other functions such as 15-minute peak consumption recording, line power monitoring, i.e., outage and restoration, tamper sensing and timekeeping are supported.

The following is a representative listing of possible sensors that may be used with the network service module of the present invention. Each sensor is optional, and to a person skilled in the art, variants may be added to the network service module of the present invention. For example, FIG. 6 illustratively shows a temperature sensor 227 and a battery sensor 228; however, each sensor 227, 228 may be substituted by or may be in addition to other possible sensors from the following representative listing of sensors.

(a) A tilt sensor 222 detects movement of the housing through an angle greater than a predetermined angle so that once the device is installed indication can be made if the device is removed or if the meter is removed from its normal orientation.

(b) A field sensor 223 detects the presence of an electric field. Unless there is power failure, the electric field sensor should continue to detect the presence of an electric field unless the meter is removed from the system.

(c) An acoustic sensor 224 detects sound. The sounds detected are up transmitted through a filter 225 which is arranged to filter by analog or digital techniques the sound signal so as to allow to pass through only those sounds which have been determined by previous experimentation to relate to cutting or drilling action particularly on the cover.

(d) A magnetic sensor 226 detects the presence of a magnetic field. A magnetic field is generated by the coils driving the disk 214 so that magnetic fields should always be present unless the meter has been by-passed or removed. As is well known, the rate of rotation of the disk is dependent upon the magnetic field and, therefore, this rate of rotation can be varied by changing the magnetic field by applying a permanent or electromagnet in the area of the meter to vary the magnetic field. The sensor 226 is, therefore, responsive to variations in the magnetic field greater than a predetermined amount so as to indicate that an attempt has been made to vary the magnetic field adjacent the disk to slow down the rotation of the disk.

(e) A heat sensor 227 detects temperature so that the temperature associated with a particular time period can be recorded. A battery level sensor is indicated at 228. The sensors 226, 227, and 228 communicate information through analog digital converter 328 to the microprocessor 220. The information from sensors 227 and 228 can be communicated to provide "housekeeping" status of the operation of the unit. The temperature sensor 227 can be omitted, if required, and this information replaced by information gained from a public weather information source. In some cases the meter is located inside the building and hence the temperature will remain substantially constant whereas the outside temperature is well known to vary consumption quite dramatically.

(f) A consumption sensor comprises a direct consumption monitor 229 which can be of a very simple construction since it is not intended to act as an accurate measure of the consumption of the electricity used. The direct consumption monitor 229 can, therefore, simply be a device which detects the value of the magnetic field generated on the assumption this is proportional to the current drawn. The direct consumption value obtained can then be competed with a measurement of the consumption as recorded by the rotation of the disk 214. In the event that the direct consumption monitor 229 provides a sum of the consumption over a time period which is different from the consumption measured by rotation of the disk 214 by an amount greater than a predetermined proportion then the direct consumption monitor can be used to provide a tamper signal. This would be indicative, for example, of a mechanical tag applied to the disk to reduce recorded consumption.

(g) A reverse sensor 230, discussed in more detail hereinafter, detects reverse rotation of the disk 214 and provides an input to the microprocessor on detection of such an event.

(h) A cover sensor 231 is used to detect the continual presence of the cover 213. The cover sensor comprises a light emitting diode (LED) 232 which generates a light beam which is then reflected to a photo diode 233. The absence of the reflected beam at the photo diode 233 is detected and transmitted as a tamper signal to the microprocessor. The reflected beam is generated by a reflective strip 234 applied on the inside surface of the cover adjacent the diode 232 as shown in FIG. 6.

The above sensors thus act to detect various tampering events so that the presence of such tampering events can be recorded in the storage memory 221 under the control of the microprocessor 220.

The microprocessor 220 also includes a clock signal generator 335 so that the microprocessor 220 can create a plurality of time periods arranged sequentially and each of a predetermined length. In the example of the present invention shown, the time periods are eight hours in length and the microprocessor 220 is arranged to record in each eight hour period the presence of a tamper event from one or more of the tamper signals.

Figure 8:
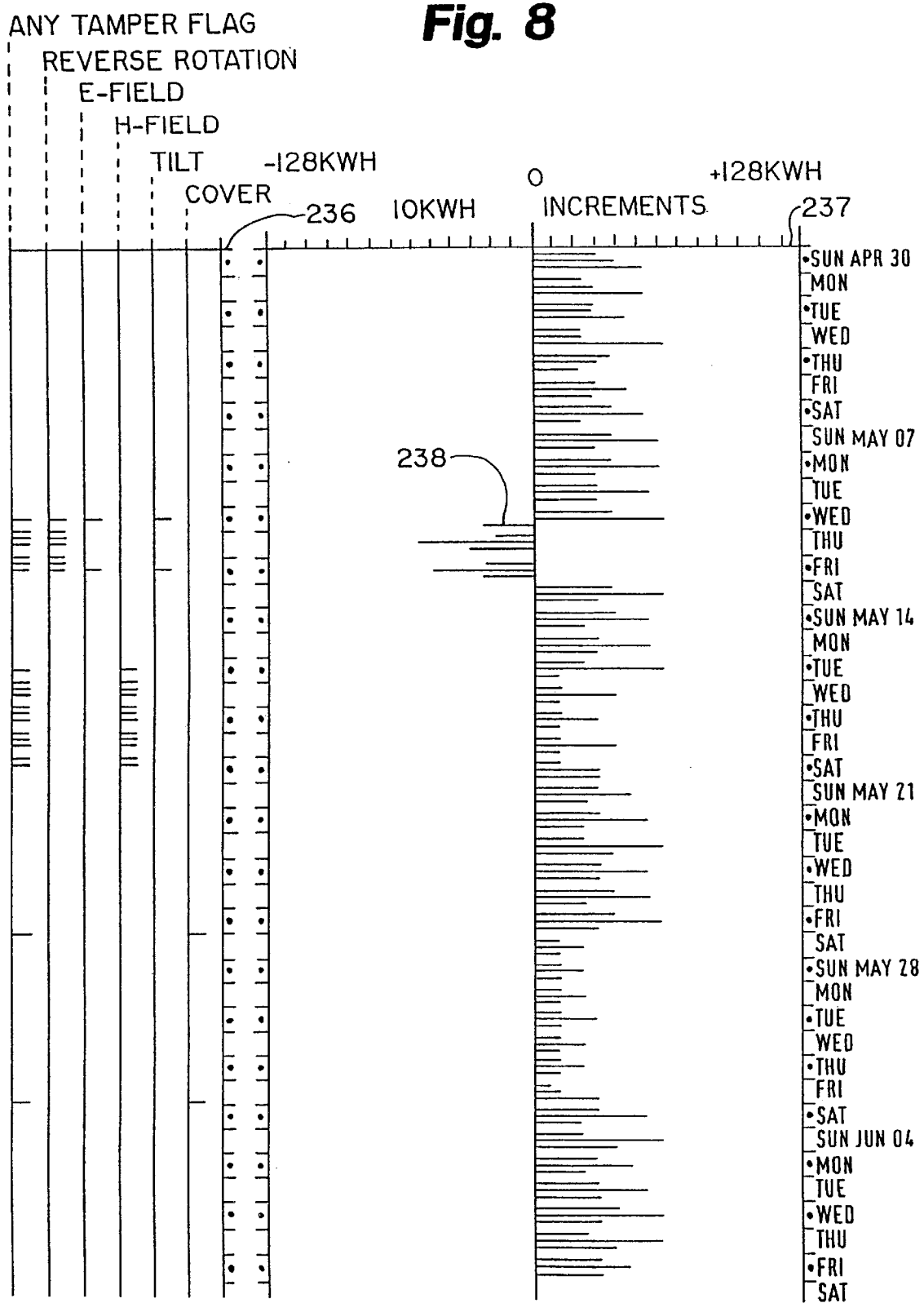
FIG. 8 is an illustration of a typical printout of information obtained by the network service module of FIG. 1.

As shown in FIG. 8 the series of the predetermined time periods is recorded with the series allocated against specific dates and each eight hour period within the day concerned having a separate recording location within the storage memory 221. One such series is shown in FIG. 8 where a number of tampering events 236 are indicated. The print-out thus indicates when any tampering event 236 has occurred and in addition then identifies which type of tampering event has taken place.

The rotation of the disk 214 also is detected to accurately record the number of rotations of the disk both in a forward and in a reverse direction. In FIG. 8, a table 237 shows in graphical form the amount of rotation of a disk recorded in eight hour periods as previously described. For one period of time the disk is shown to rotate in a reverse direction 238. Whenever the disk rotates in a reverse direction, the reverse rotation subtracts from the number of turns counted on the conventional recording system 215 shown in FIG. 6.

As shown in FIGS. 6 and 7, detection of the rotation of the disk is carried out by the provision of a dark segment 239 formed on the undersurface of the disk leaving the remainder of the disk as a reflective or white material. The detection system thus provides a pair of light emitting diodes 240, 241 which are positioned on the housing so as to direct light onto the underside of the disk. The light emitting diodes 240, 241 are angularly spaced around the disk. The diodes are associated with the photo diodes 242, 243 which receive light when the disk is positioned so that the light from the associated light emitting diode 240, 241 falls upon the reflective part of the disk and that light is cut off when the dark part of the disk 214 reaches the requisite location. Basically, therefore, one of the pairs of light emitting diodes 240, 241 and photo diodes 242, 243 is used to detect the passage of the dark segment, that is of course, one rotation of the disk. The direction of rotation is then detected by checking with the other of the pairs as the dark segment reaches the first of the pairs as to whether the second pair is also seeing the dark segment or whether it is seeing the reflective part. Provided the sensors are properly spaced in relation to the dimension of the segment, therefore, this indicates the direction which the disk rotated to reach the position which is detected by the first pair of diodes.

In order to conserve energy, the sensors are primarily in a sampling mode using an adaptive sensing rate algorithm. In one example, the dark or non-reflective segment is 108° of arc and there is provided a 50° displacement between the sensors. In a practical example of a conventional meter, the maximum rotation rate is of the order of 2 rps. A basic sample interval can be selected at 125 m/sec, short enough to ensure at least one dark sample is obtained from the dark segment. In operation, only the first pair of sensors is sampled continuously. When a dark response is observed, a second confirming sample is obtained and the sample rate increased to 16 pps. As soon as a light segment of the disk is sensed, the second sensor is sampled. The second sensor still sees the dark segment then cw rotation is confirmed while if a light segment is observed then ccw rotation is indicated.

At slower speeds, the algorithm results in a sample rate of 8 pps for 70% of a rotation and 16 pps for 30% of a rotation for the first pair of sensors plus two samples for direction sensing for the second pair. For an annual average consumption of 12,000 kwh, the disk rotates approximately 1.6 million times.

In order to sense the presence of stray light which could interfere with measurements, the photo diode output is sampled immediately before and immediately after the LED is activated. If light is sensed with the LED off, and stray light is indicated an alarm may be initiated after confirming test. The latter may include a test of other sensors such as the optical communication port sensor discussed hereinafter.

As shown in FIG. 5, communication from the meter reading unit is carried out by radio transmission from the microprocessor 220 through a modulation device 250 which connects to the antenna 322. The transmission of the signal is carried out under control of the microprocessor 220. Modulation carried out by the modulation device 250 can be of a suitable type including, for example, phase modulation using phase shift keying (PSK) such as binary PSK (BPSK), frequency modulation using frequency shift keying (FSK), such as, for example, binary FSK, or spread spectrum modulation in which the signals are modulated onto a number of separate frequencies at timed intervals so that no single frequency channel is used. This allows the system to be used without the allocation of a dedicated frequency so that the signal appears merely as noise to receivers which do not have access to the decoding algorithm by which the signal can be recovered from the different frequencies on which it is transmitted.

Remote Cell Node

A plurality of remote cell nodes 112 are located within the geographical area and are spaced approximately uniformly and such that each network service module 110 is within a range of several remote cell nodes 112 to provide overlapping coverage. The remote cell nodes 112 typically might be spaced at 0.5 mile intervals on utility poles or light standards. Each remote cell node 112 provides coverage over a limited area much like the cell in a cellular telephone network. Remote cell nodes 112 preferably are spaced to provide overlapping coverage so that, on an average, each NSM-packet signal transmitted by a network service module 110 is received by three or four remote cell nodes 112, even in the presence of temporary fading. As a consequence, erection of a tall building near a network service module 110 has little or no effect on message reception, nor does the failure of a remote cell node 112 result in loss of NSM-packet signals or NSM data.

Figure 9:
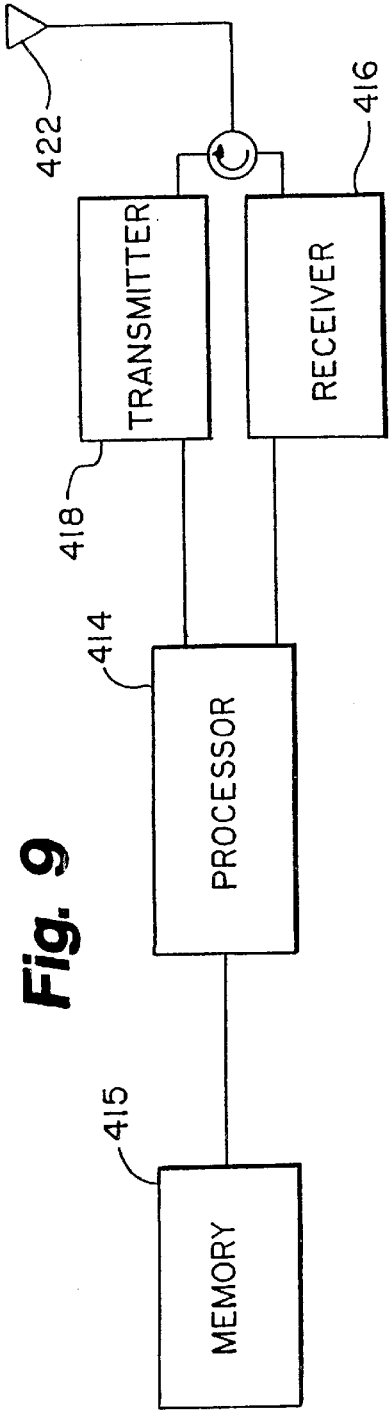
FIG. 9 is a remote cell node block diagram.

As illustratively shown in FIG. 9, each remote cell node (RCN) 112 of FIG. 1 includes RCN-transmitter means, RCN-receiver means, RCN-memory means, RCN-processor means and an RCN antenna 422. The RCN-transmitter means, RCN-receiver means, RCN-memory means and RCN-processor means may be embodied as an RCN transmitter 418, RCN receiver 416, RCN memory 415 and RCN processor 414, respectively. The RCN transmitter 418 and the RCN receiver 416 are coupled to the RCN antenna 422. The RCN processor 414 is coupled to the RCN transmitter 418, RCN receiver 416, and RCN memory 415.

The RCN transmitter 418, under the control of the RCN processor 414, transmits at the first carrier frequency or the second carrier frequency a command signal. The choice of frequency depends on which frequency is being used for the NSM receiver 316 at each of the plurality of network service modules 110. Transmitting a command signal from the RCN transmitter is optional, and is used if the NSM receiver 316 is used at the network service module 110. The command signal can include signaling data being sent to network service modules 110. The signaling data may require the network service module 110 to transmit status or other data; set reporting time period, e.g., from an eight hour period to a four hour period; and any other command, control or "housekeeping" jobs as required.

The RCN receiver 416 receives at the first carrier frequency a multiplicity of NSM-packet signals transmitted from a multiplicity of network service modules 110. Each of the multiplicity of NSM-packet signals typically are received at different points in time, since they are transmitted at a time which is randomly or pseudorandomly selected within the predetermined time period. The multiplicity of network service modules 110 usually is a subset of the plurality of network service modules 110. Received NSM-packet signals are time stamped by the RCN processor 414 and temporarily stored in the RCN memory 415 before being transmitted to the next higher network level. The RCN receiver 416 also receives polling signals from the intermediate data terminal, and listens or eavesdrops on neighboring remote cell nodes when they are polled by the intermediate data terminal.

The RCN processor 414 collates the NSM-packet signals received from the network service modules, identifies duplicates of NSM-packet signals and deletes the duplicate NSM-packet signals. The RCN processor 414 controls the RCN transmitter 418 and RCN receiver 416. The RCN memory 415 stores the received multiplicity of NSM-packet signals. Thus each remote cell node 112 receives, decodes and stores in RCN memory 415 each of these NSM-packet signals as received from the network service modules 110.

The remote cell node comprises simply a suitable resistant casing which can be mounted upon a building, lamp standard, or utility pole at a suitable location in the district concerned. The remote cell node can be battery powered with a simple omni-directional antenna as an integral part of the housing or supported thereon.

Information accumulated at remote cell nodes 112 periodically is forwarded via a polled radio communications link to a higher level network node, as illustrated in FIG. 1, termed an intermediate data terminal 114. The intermediate data terminals 114 are spaced typically at 4 mile intervals and can be conveniently sited at substations, providing coverage for up to 100 cells. Remote cell nodes also receive timing information and command signals from intermediate data terminals.

When a polling signal is sent from an intermediate data terminal 114, the RCN transmitter 418 transmits at the first carrier frequency the stored multiplicity of NSM-packet signals as an RCN-packet signal to the intermediate data terminal 114.

When a first remote cell node is polled with a first polling signal by the intermediate data terminal, neighboring remote cell nodes 112 receive the RCN-packet signal transmitted by the first remote cell node. Upon receiving an acknowledgment signal from the intermediate data terminal that polled the first remote cell node, at the neighboring remote cell nodes 112, the respective RCN processor deletes from the respective RCN memory messages from the network service modules that have the same message identification number as messages transmitted in the RCN-packet signal from the first remote cell node to the intermediate data terminal. The message identification number is illustrated in a typical NSM-data packet in FIG. 3.

FIG. 1 illustrates a plurality of the network service modules 110. The network service modules 110 are set out in a pattern across the ground which is dependent upon the positions of the utility usage which generally does not have any particular pattern and the density will vary significantly for different locations.

The remote cell nodes 112 are arranged in an array with the spacing between the remote cell nodes 112 relative to the network service modules 110 so that each remote cell node 112 can transmit to at least two and preferably four of the remote cell nodes 112. Thus, the remote cell nodes 112 are provided in significantly larger numbers than is absolutely necessary for each network service module 110 to be received by a respective one of the remote cell nodes 112. The remote cell nodes 112 theoretically receive high levels of duplicate information. In a normal residential situation, the location of the remote cell nodes 112, so that each network service module 110 can be received by four such remote cell nodes 112, would lead to an array in which each remote cell node 112 would be responsive to approximately 1,000 of the network service modules 110.

Each of the network service modules 110 is arranged to calculate an accumulated value of utility usage for a set period of time which in the example shown is eight hours. Subsequent to the eight hour period, the NSM controller 314 prepares to transmit the information in a packet of data as an NSM-packet signal. The packet of data includes:

(a) The total of usage during the set period, i.e., eight hours.

(b) The accumulated total usage stored in the NSM memory 315 to date. The transmission of this information ensures that even if a message is lost so that the total for one of the time periods is not communicated to the central data terminal, the central data terminal 120 can recalculate the amount in the missing time periods from the updated accumulated total.

(c) Some or all of the tamper signals defined above.

(d) The time of transmission.

(e) A message number so that the messages are numbered sequentially. In this way, again the remote cell node 112 can determine whether a message has been lost or whether the information received is merely a duplicate message from a duplicate one of the receiving stations.

(f) "Housekeeping information" concerning the status of the network service module 110, for example, the temperature and the battery level indicator sensor values.

When information is received at the remote cell node 112, the RCN controller 414 acts to store the information received in the RCN memory 415 and then to analyze the information. The first step in the analysis is to extract from the received messages the identification code relating to the respective network service module 110. The information relating to that network service module 110 is introduced into a RCN memory register relating to that network service module 110 to update the information already stored.

One technique for avoiding transmission of duplicate information from the remote cell nodes 112 to the intermediate data terminal 114 can be used in which each remote cell node 112 monitors the transmissions of the other remote cell nodes 112. When the signals are monitored, the information transmitted is compared with information stored in any other remote cell node 112 doing the monitoring, and if any information is found in the memory of the remote cell node 112 which is redundant, that information is then canceled. In this way when very high levels of redundancy are used, the time for transmission from the remote cell node 112 to the intermediate data terminal is not significantly increased.

In addition to the transmission periodically of the usage data, each network service module 110 can be arranged to transmit an alarm signal upon detection of the removal of the electric voltage. The transmission of the alarm signal can be delayed by a short random period of time so that if the loss of the voltage is due to a power outage covering a number of locations all signals are not received at the same time. The remote cell nodes 112 and intermediate data terminals 114 also can be programmed to retransmit such alarm signals immediately. In this way, the central data terminal 120 has immediate information concerning any power outages including the area concerned. This can, of course, enable more rapid repair functions to be initiated.

Furthermore, the remote cell nodes 112 can be arranged to transmit control signals for operating equipment within the premises in which the network service module 110 is located. The remote cell nodes 112 are necessarily arranged in a suitable array to transmit such information so that it is received in each of the premises concerned using again relatively low transmission power and using the equipment provided for the meter reading system. This transmission capability can be used to control, for example, radio controlled switches within the premises of relatively high power equipment for load shedding at peak periods. In similar arrangements the network service module 110 may include a receiving facility to enable detection of signals transmitted by the remote cell nodes 112. In one example, these signals may relate to synchronizing signals so that each of the network service modules 110 is exactly synchronized in time with the remote cell node 112 and/or intermediate data terminal 114 and central data terminal 120. This exact synchronization can be used for accurately detecting usage during specific time periods so that the utility may charge different rates for usage during different time periods for the purpose of particularly encouraging use at non-peak times again for load shedding purposes.

The attenuation of a radio signal is proportional to the inverse of the distance from the source to the power N. In free space, N is equal to 2. In more practical examples where buildings, trees, and other geographical obstructions interfere with the signal, N generally lies between 4.0 and 5.0. This effect, therefore, significantly reduces the distance over which the signal from the network service module can be monitored. Thus, the number of network service modules is significantly reduced which can be monitored by a single remote cell node.

Furthermore, the large N rapidly reduces the signal strength after a predetermined distance so that while a network service module can be effectively monitored at a certain distance, the signal strength rapidly falls off beyond that distance. This enables the cells defined by each remote cell node 112 to be relatively specific in size and for the degree of overlap of the cells to be controlled to practical levels without wide statistical variations.

An advantage of the present system is that network service modules 110, which are located at a position which is geographically very disadvantageous for transmission to the closest remote cell node 112, may be monitored by a different one of the remote cell nodes 112. Thus, in conventional systems some of the network service modules 110 may not be monitored at all in view of some particular geographical problem. In the present invention, this possibility is significantly reduced by the fact that the network service module 110 concerned is likely to be in a position to be monitored by a larger number of the remote cell nodes 112 so that the geographical problem most probably will not apply to all of the remote cell nodes.

The increased density of remote cell nodes 112 permits the network service modules 110 to operate with an integral NSM antenna 322 which can be formed as part of the meter reading unit housed within the conventional electric utility meter. In this way, the network service module 110 can be totally self-contained within the meter housing thus allowing installation within a very short period of time, avoiding customer dissatisfaction caused by wiring problems, and reducing the possibility of damage to a separately mounted NSM antenna 322. In addition, this arrangement significantly reduces the cost of the network service module 110 to a level which is economically viable to allow installation of the system.

The present invention can employ a system in which the network service modules 110 are permitted to transmit only during a predetermined time period so that an open time period is available for communication on the same frequency between the intermediate data terminal 114 and the remote cell node 112 without any interference from the remote cell nodes 112. This level of communication can be carried out using a polling system from the intermediate data terminals 114 to each of the remote cell nodes 112, in turn, preferably including a directional transmission system at the intermediate data terminal 114. This system allows optimization of the remote cell node 112 density to meet cost/performance criteria in different deployment scenarios.

The present invention, by recognizing the non-volatile nature of the information source and the acceptability of missing an occasional update through transmission errors or collisions enables the implementation of data collection networks of greater simplicity and at lower cost than is possible with established communication network approaches involving two-way communication. The present invention, therefore, provides a radio communication network which can be employed to acquire data from a large number of remote meter monitoring devices disposed over a wide area using very low power transmitters in conjunction with an array of remote cell nodes all operating on a single radio communication channel or frequency.

Intermediate Data Terminal

The plurality of intermediate data terminals 114 are located within the geographic area and are spaced to form a grid overlaying the geographic area. The intermediate data terminals 114 typically are spaced to cover large geographic areas. Intermediate data terminals 114 preferably are spaced to provide overlapping coverage, so that on an average, an RCN-packet signal transmitted from a remote cell node 112 is received by two or more intermediate data terminals.

Figure 10:
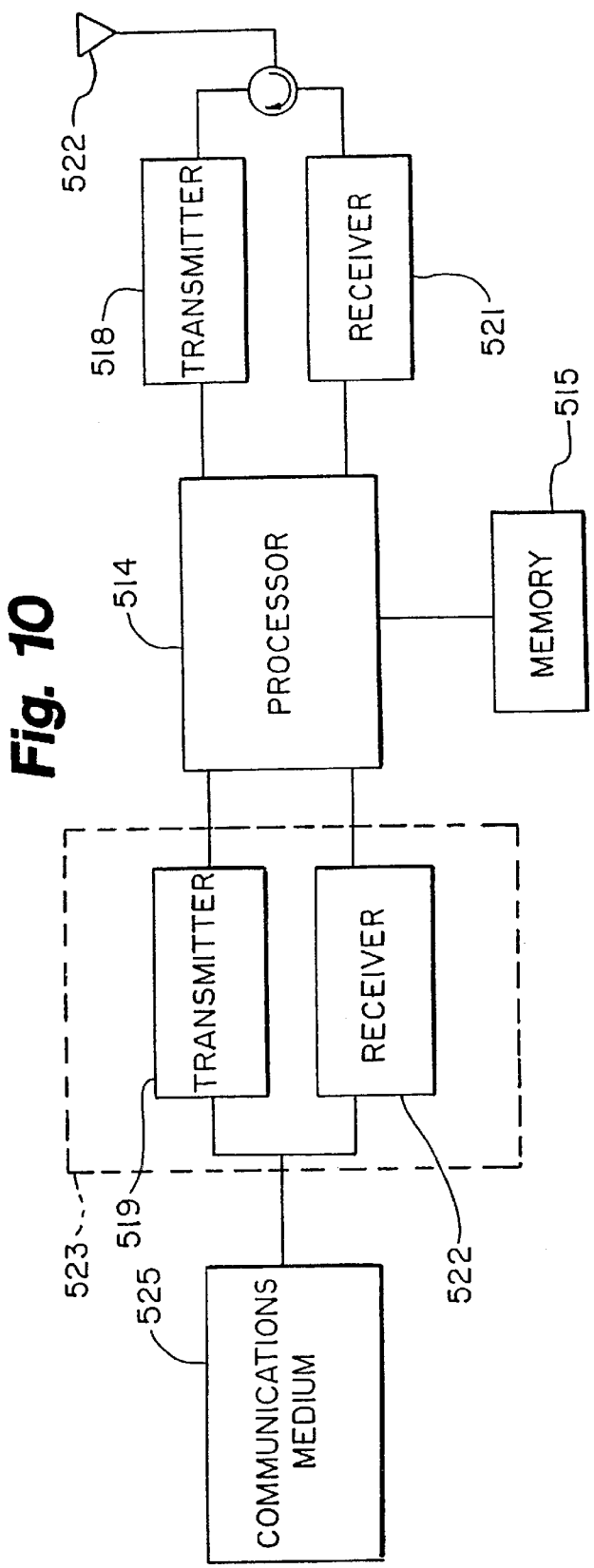
FIG. 10 is an intermediate data terminal block diagram.

As illustratively shown in FIG. 10, each intermediate data terminal 114 includes first IDT-transmitter means, second IDT-transmitter means, IDT-memory means, IDT-processor means, first IDT-receiver means, second IDT-receiver means and an IDT antenna. The first IDT-transmitter means, second IDT-transmitter means, IDT-memory means, IDT-processor means, first IDT receiver means and second IDT-receiver means may be embodied as a first IDT transmitter 518, second IDT transmitter 519, IDT memory 515, IDT processor 514, first IDT receiver 521 and second IDT receiver 522, respectively. The first IDT transmitter 518 and the first IDT receiver 521 are coupled to the IDT antenna 522. The IDT processor 514 is coupled to the first and second IDT transmitters 518, 519, the first and second IDT receivers 521, 522, and IDT memory 515. The second IDT transmitter 519 and second IDT receiver 522 may be embodied as a device such as a modem 523.

The first IDT transmitter 518 under the control of the IDT processor 514, includes a synthesizer or equivalent circuitry for controlling the carrier frequency, and allowing the first IDT transmitter 518 to change carrier frequency. The first IDT transmitter 518 transmits preferably at the first carrier frequency, or the second carrier frequency, the first polling signal using a first polling-access protocol to the plurality of remote cell nodes 112. When the first polling signal is received by a remote cell node, that remote cell node responds by sending the RCN-packet signal to the intermediate data terminal 114 which sent the first polling signal. If the intermediate data terminal 114 successfully receives the RCN-packet-signal, then the first IDT transmitter 518 sends an acknowledgment signal to the remote cell node. Upon receiving the acknowledgment signal, the RCN processor 414 at that remote cell node deletes, from the RCN memory 415, the data sent in the RCN-packet signal to the intermediate data terminal.

Intermediate data terminals 114 also communicate timing information and command signals to remote cell nodes 112. Remote cell nodes 112 serving important SCADA functions can be polled more frequently by an intermediate data terminal 114 to reduce network response time.

The first IDT receiver 521 receives the RCN-packet signal transmitted at the first carrier frequency from the remote cell node which was polled. Thus, after sequentially polling a plurality of remote cell nodes 112, the first IDT receiver 521 has received sequentially in time a plurality of RCN-packet signals.

The IDT memory 515 stores the received RCN-packet signals. The IDT processor 514 collates the NSM-packet signals embedded in the RCN-packet signals received from the plurality of remote cell notes, identifies duplicates of NSM-packet signals and deletes the duplicate NSM-packet signals, i.e., messages from network service modules that have the same message identification number.

In response to a second polling signal from a central data terminal 120, the second IDT transmitter 519 transmits a plurality of RCN-packet signals as an IDT-packet signal to the central data terminal 120. The second IDT transmitter 519 and second IDT receiver 522 may be embodied as a modem 523 or other device for communicating information over a communications medium 525 linking the intermediate data terminal with the central data terminal.

The intermediate data terminals 114 may include one or more directional antennas 522. During the quiet time, the intermediate data terminal 114 is arranged to direct the antenna 522 or antennas to each of the remote cell nodes 112, in turn, and to transmit to the respective remote cell node 112 the first polling signal calling for the remote cell node 112 to transmit the stored information from the RCN memory 415. Use of more than one antenna can allow communication with more than one remote cell node 112 at a time. The remote cell node 112 is required, therefore, merely to transmit the information upon request in a collated package of the information which is transmitted to the intermediate data terminal 114 and collected for analysis.

Central Data Terminal

At the upper level of the hierarchy is a central data terminal 120 which acts as a network control center and data consolidation point. The central data terminal 120 controls basic network operation, allowing it to make global decisions regarding network organization. The central data terminal's purpose is to integrate information from a variety of network nodes into a coherent form which may be forwarded to different utility operating groups for specific applications. In addition to linking regional data terminals, the central data terminal 120 is connected to critical SCADA sites some of which may be co-located with intermediate data terminals 114 at sub-stations. At this level, there are relatively few communication links, so those required can be selected to optimize cost, speed, and reliability. The transmission between the central data terminal 120 and the plurality of intermediate data terminals 114 is carried out using a communications medium 525 such as telephone lines, T1 carriers, fiber optic channels, coaxial cable channels, microwave channels, or satellite links.

Figure 11:
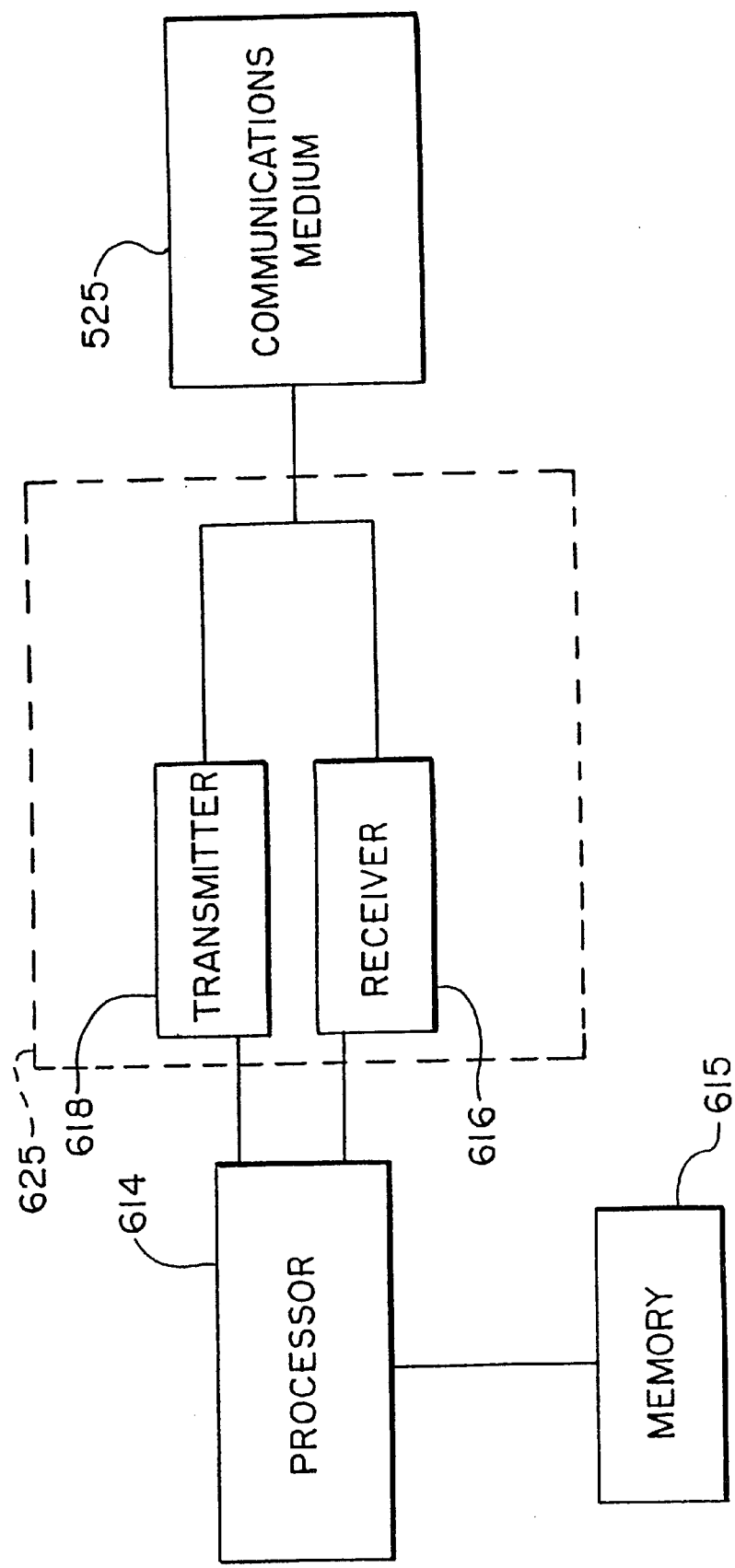
FIG. 11 is a central data terminal block diagram.

As illustratively shown in FIG. 11, the central data terminal (CDT) 120 includes CDT-transmitter means, CDT-receiver means, CDT-processor means and CDT-memory means. The CDT-transmitter means, CDT-receiver means, CDT-processor means and CDT-memory means may be embodied as a CDT transmitter 618, CDT receiver 616, CDT processor 614 and CDT memory 615, respectively. The CDT transmitter 618 and CDT receiver 616 are coupled to the communications medium 525. The CDT processor 614 is coupled to the CDT transmitter 618, CDT receiver 616 and CDT memory 615. The CDT transmitter 618 and CDT receiver 616 may be a modem 625 or other device suitable for communicating information over the As communications medium 525 between the central data terminal 120 and each intermediate data terminal 114.

The CDT transmitter 618 transmits sequentially in time the second polling signal using a second polling access protocol to the plurality of intermediate data terminals 114. The CDT receiver 616 receives a plurality of IDT-packet signals. The CDT processor 614 decodes the plurality of IDT-packet signals as a plurality of NSM data. The CDT processor 614 also identifies duplicates of NSM data and deletes the duplicate NSM data. The CDT memory 615 stores the NSM data in a data base. The NSM data is outputted, analyzed, or processed as desired.

Utility Overview

The performance of the network is in large part determined by the network service module 110 to remote cell node 112 link performance, which is defined by the network service module message loss rate. The network architecture is designed to minimize the network service module message loss rate, which is defined as the fraction of transmitted network service module messages which are not received by the remote cell nodes. The two issues that affect the message loss rate are:

1. relatively large and varying pathloss which is caused by the nature of the urban propagation environment; and
2. simultaneous message transmissions, or collisions, which are a problem for any multiple-access system.

The issue of large and varying pathloss is resolved through the use of:

1. transmit power adjustment;
2. path redundancy, controlled by the remote cell node grid spacing; and
3. multiple transmissions per day.

The collision issue is resolved using:

1. path redundancy, controlled by the remote cell node grid spacing;
2. multiple transmission per day;
3. partitioning of traffic according to priority; and
4. capture effect.

Remote cell node spacing can be selected to control the path redundancy, thus leading to an adjustable level of performance. Notice that path redundancy and multiple transmission per day are used to resolve both issues, and thus are principle features of the wide area communications network. The effect of collisions is minimal, so the probability of receiving a packet any time during the day is maintained at exceptionally high levels.

The link budget contains all of the gains and losses between the network service module power amplifier and the remote cell node receiver, and is used to calculate the maximum pathloss which can be allowed on any link. The minimum receivable signal at the remote cell node is estimated as −115 dBm, which is equal to the sum of the noise floor and the carrier to noise level which is required in order to receive the message (10 dB).

Every network service module has many remote cell nodes within receiving range, which increases the reliability of packet reception. When a network service module transmits it has the potential to be received by many remote cell nodules. Some of the remote cell nodules are in shadow fading zones and do not receive the signal whereas others have an increased signal due to shadowing.

Even though some of the remote cell nodes 112 are quite far from the network service module 110, and thus the average pathloss is below the maximum allowed limit, it is still possible to receive the network service module if the signal level fluctuations, shadowing, multipathing, etc., contribute enough to the signal level. Similarly, some remote cell nodes which are close to the network service module do not hear the network service module because the signal variations decrease the signal network level by a significant amount.

During the life of the system, the urban landscape changes due to building construction and demolition and foliage growth. These changes in landscape affect the network service module-remote cell node links, causing some remote cell nodes to no longer receive the network service module while new remote cell nodes do receive the network service module. For each link that is no longer available it is expected that a new link becomes operational.

Figure 12:
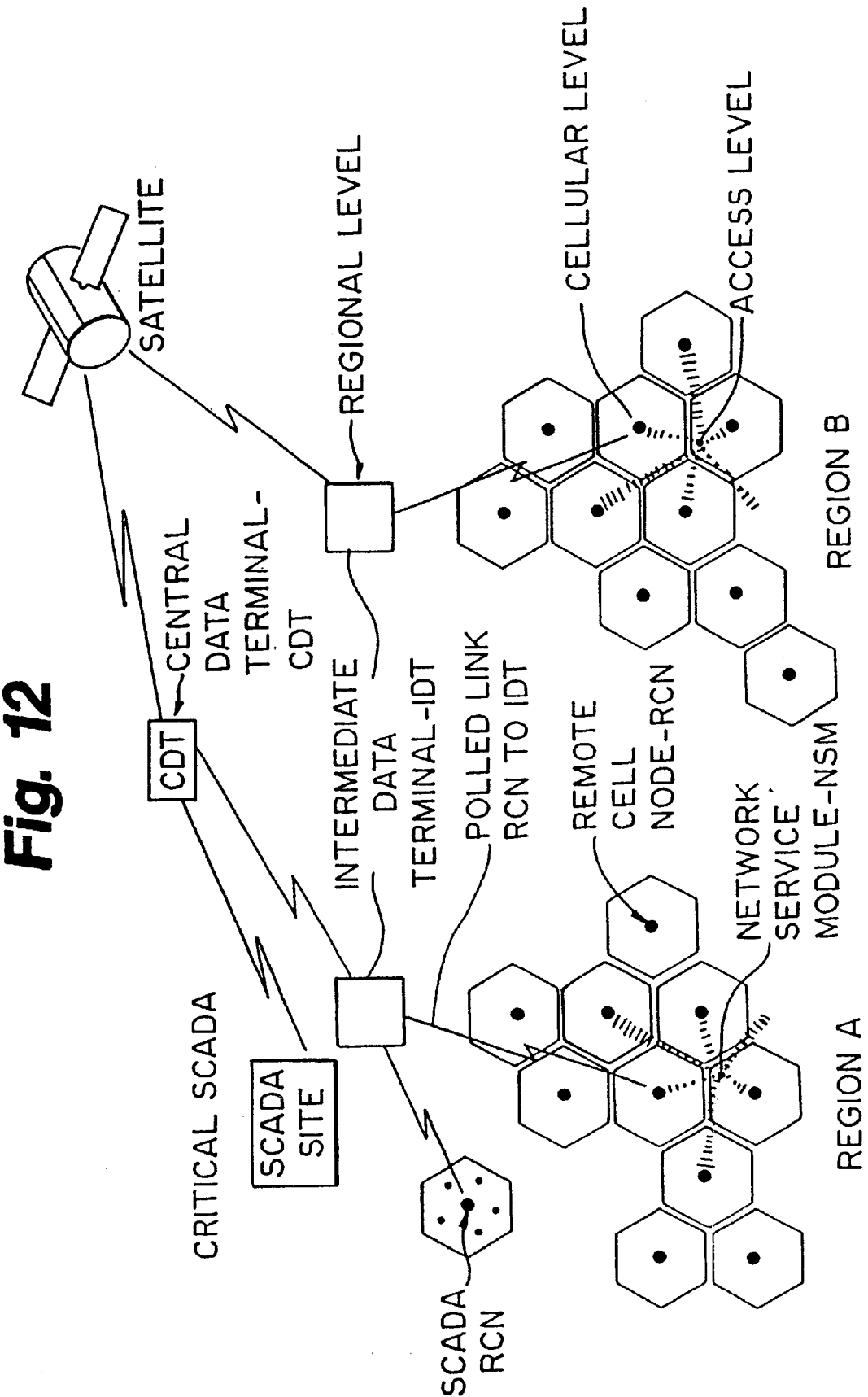
FIG. 12 shows the configuration of the communications network for serving widely separated geographic areas.

The wide area communications network can readily and cost effectively expand to support new hardware and application software growth scenarios. The wide area communications network can be implemented in those regions of the user's service territory and for those services which are most needed on an implementation plan which is not affected by geographic distribution. FIG. 12 illustrates the configuration of the wide area communications network for serving widely separated geographic areas. This includes the provision of wide area communications network services to isolated smaller communities via satellite, fiber optic, microwave, or other back bone network. Due to the unique nature of wide area communications network's single channel, micro cellular scattering propagation concept, it is immune to traditional radio problems such as fading, nulls, multi-path, lack of line of sight typical of mountainous, hilly, valley, or high density urban setting.

The wide area communications network supports a broad range of monitoring, verifiable control and fast response transaction applications. A number of these application needs are and continue to be identified by utilities. Due to the standardized network interface protocol and message packet configuration, the wide area communications network is able to readily augment its service offerings in either new hardware or software. The wide area communications network offers not only specialized network service modules for electric, gas, and water meters but also provides a series of generic modules with industry standard in/output interfaces for contact closure, voltage or current sensing. This allows a variety of vendors to incorporate a wide area communications network communication interface into their own products be they fuses, alarms, temperature sensors, etc.

The wide area communications network can provide a single integrated data channel for other utility operational applications. Some of these applications are hardware oriented but many are application software oriented. They involve the generation of new value-added information reports or services. Although some are primarily for use by the utility, many of them could be offered for sale to the customer thus resulting in a new revenue stream for the utility.

The wide area communications network can support the expansion of SCADA due to its highly reliable wireless communication capabilities. Many utilities would like to add instrumental monitoring points to their SCADA, however, the wiring costs or difficulties often associated with these prohibits SCADA growth at a sub-station or other site. Generic network service modules could be used to solve these problems.

The hierarchical design of wide area communications network allows the customer to service an arbitrarily large contiguous or non-contiguous geographic area, as shown in FIG. 12, containing many applications and a large number of end points.

The key issues related to expansion are:
1. The size and arrangement of the geographic area;
2. The number of end points which can be serviced; and
3. The ease with which the number of applications can be increased.

The hierarchical design of the network allows non-contiguous areas to be serviced over a wide geographic area. Separate areas have their own intermediate data terminal communicating with the central data terminal. Data from non-contiguous areas would be transferred at the central data terminal level.

Figure 13:
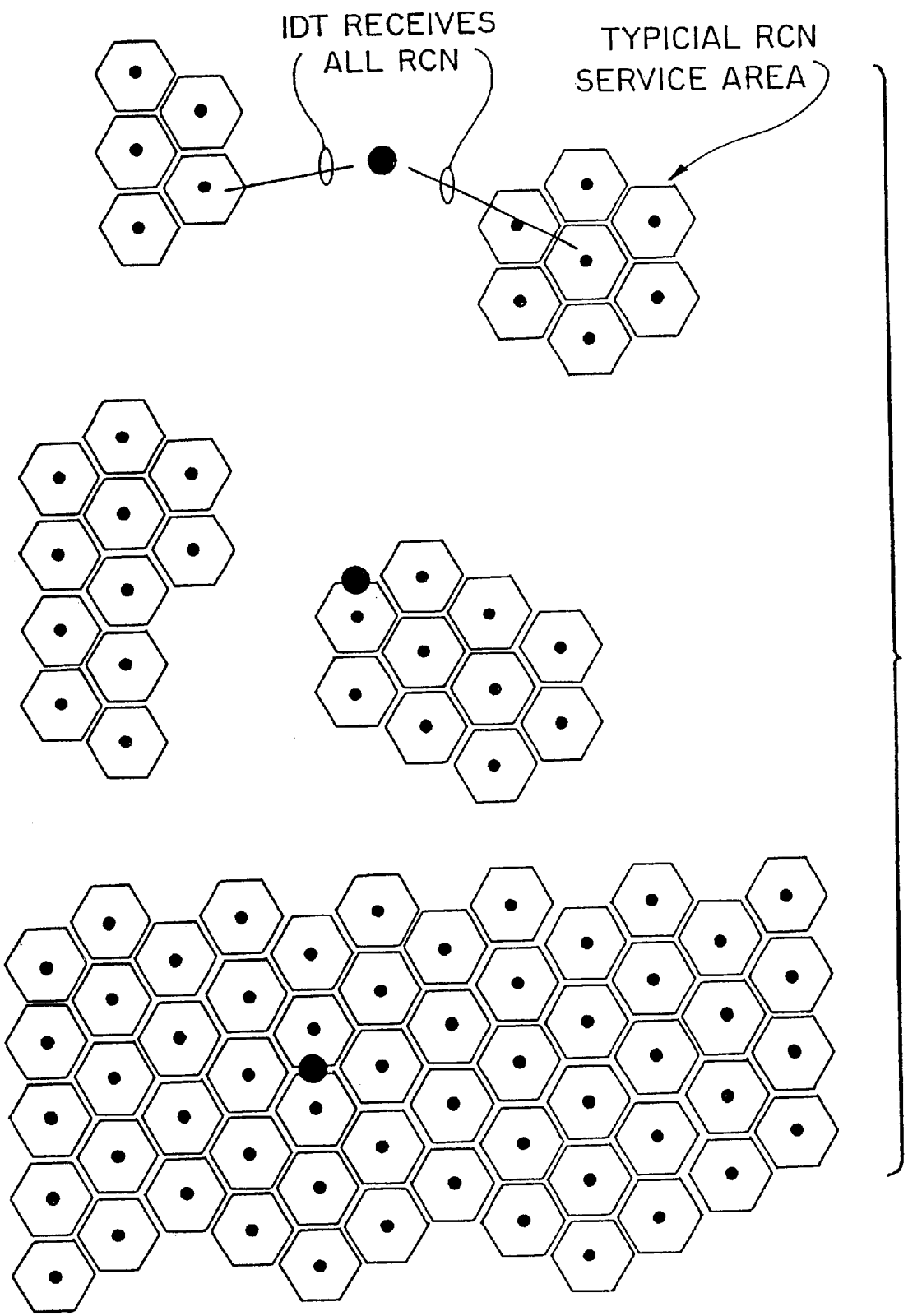
FIG. 13 illustrates a typical communications network with gradual growth in the number of areas served.

As the number of end points increases, either due to an increase in the number of applications in a geographic area or due to an increase in the size of the geographic area being serviced, the network traffic increases. The amount of additional traffic created depends on the type of application being added. Traffic increases in the wide area communications network are dealt with by hardware expansion at the central data terminal and by installation of additional intermediate data terminals in the new area. FIG. 13 illustrates a typical communications network with gradual growth in the number of areas served.

As the number of end points increases, another issue of concern is the identification of the message source. Wide area communications network provides over one trillion serial numbers for each type of service module, which allows unique module identification over the life of the system.

As the number of applications increases, the amount of traffic from a given square mile is assumed to also increase. Simulations to the present time have indicated that more than 20,000 end points can be serviced per square mile, with this maximum number depending on the details of remote cell node deployment, house density and message reporting frequency. A dense urban area with 35 ft. by 100 ft. lots contains approximately 5,000 homes per square mile.

Centralized control of wide area communications network is achieved by allowing the central data terminal to have access to network status data, which it uses to make decisions regarding network optimization. These decisions are downloaded to the intermediate data terminals and remote cell nodes as required.

Centralized traffic control is achieved at the remote cell node and intermediate data terminal levels by using priority tables, message storage instructions and alarm storage instructions. The structure of the priority tables is described as follows.

In each message that is transferred through the system, there is a set of identification tags stating the message type and the source. The priority tables in the remote cell nodes 112 and intermediate data terminals 114 contain a listing of all identification tags in the system and the priority tables are first installed at the time of deployment, but can be updated from the central data terminal 120 as required. During the network operational period there may be a need to change message priorities, which can then be performed with minimal impact on the network traffic.

Control of the alarm traffic within the network requires another table because alarm reporting generates higher traffic levels for a short period of time. This bursty traffic generation can lead to congestion problems, and so an alarm instruction table allows the central data terminal to clear alarm messages out of remote cell node and intermediate data terminal buffers at the end of the alarm. This priority table also allows the utility to tailor the alarm traffic delay to suit its particular needs.

Both the priority tables and the alarm instructions are used by the message storage instruction module to properly manage traffic on the network. The message storage instructions maintain the message queue, ensure that response times are within specification, and transmit performance data to the central data terminal to be used for network control.

The network service modules transmit messages to the remote cell nodes, which then use the tables discussed above to organize the message queue. All messages reach the application switch with the specified delay. The central data terminal downloads data to the three control modules and tables as required.

It will be apparent to those skilled in the art that various modifications can be made to the communications network for collecting data from remote data generating stations of the instant invention without departing from the scope or spirit of the invention, and it is intended that the present invention cover modifications and variations of the communications network provided they come within the scope of the appended claims and their equivalents.

What is claimed is:

1. A radio communication network for collecting data generated by a plurality of utility meters located within a geographic area, comprising:

a plurality of meter reading units, with each meter reading unit coupled to a respective utility meter and including a low-power transmitter to autonomously transmit by wireless radio signals representative of at least a portion of the data generated by the meter reading unit for that utility meter;

a plurality of fixed receiving stations located within the geographic area, there being fewer receiving stations than meter reading units with each receiving station including a receiver that receives signals transmitted from at least one meter reading unit and a transmitter that selectively transmits wireless radio signals representative of at least a portion of the data generated by at least one meter reading unit; and a central station having at least one receiver to receive signals transmitted from the plurality of receiving stations, a processor that decodes the signal, and a memory that stores data representative of at least a portion of the decoded signals in a data base.

2. The radio communication network of claim 1 wherein the low-power transmitter of each meter reader transmits at psuedo-random times.

3. The radio communication network of claim 1 wherein the low-power transmitter of each meter reader transmits at a power of less than 100 mW.

4. The radio communication network of claim 1 wherein the low-power transmitter of each meter reader transmits at distances only up to 2 kilometers.

5. The radio communication network of claim 1 wherein the central station polls each of the plurality of receiving stations to selectively transmit the signals representative of at least a portion of the data generated by at least one meter reading unit.

6. The radio communication network of claim 1 where each receiving station receives signals from no more than approximately 1,000 meter reading units.

7. The radio communication network of claim 1 wherein each receiving station transmits at distances greater than 2 kilometers.

8. The radio communication network of claim 1 wherein the utility meter is an electricity meter.

9. A radio communication network for collecting data generated by a plurality of utility meters located within a geographic area, comprising:

a plurality of meter reading units, with each meter reading unit coupled to a respective utility meter and including a low-power transmitter to autonomously transmit by wireless radio signals representative of at least a portion of the data generated by the meter reading unit for that utility meter;

a plurality of fixed receiving stations located within the geographic area, there being fewer receiving stations than meter reading units with each receiving station including a receiver that receives signals transmitted from at least one meter reading unit and a transmitter that selectively transmits wireless radio signals representative of at least a portion of the data generated by at least one meter reading unit;

a plurality of intermediate stations located within the geographic area, with each intermediate station including a receiver that receives signals transmitted from at least one receiving station and a transmitter that selectively sends signals representative of at least a portion of the data generated by at least one meter reading unit; and a central station having at least one receiver to receive signals from the plurality of intermediate stations, a processor that decodes the signal, and a memory that stores data representative of at least a portion of the decoded signals in a data base.

10. The radio communication network of claim 9 wherein the low-power transmitter of each meter reader transmits at psuedo-random times.

11. The radio communication network of claim 9 herein the low-power transmitter of each meter reader transmits at a power of less than 100 mW.

12. The radio communication network of claim 9 wherein the low-power transmitter of each meter reader transmits at distances only up to 2 kilometers.

13. The radio communication network of claim 9 wherein the central station polls each of the plurality of receiving stations to selectively transmit the signals representative of at least a portion of the data generated by at least one meter reading unit.

14. The radio communication network of claim 9 where each receiving station receives signals from no more than approximately 1,000 meter reading units.

15. The radio communication network of claim 1 wherein each receiving station transmits at distances greater than 2 kilometers.

16. The radio communication network of claim 9 wherein the utility meter is an electricity meter.

17. A radio communication network for collecting data generated by a plurality of electrical utility meters located within a geographic area, comprising:

a plurality of meter reading units, with each meter reading unit coupled to a respective electrical utility meter and including a low-power transmitter to autonomously transmit by wireless radio at psuedo-random times and at a power of less than 100 mW and distances of only up to 2 kilometers signals representative of at least a portion of the data generated by the meter reading unit for that electrical utility meter;

a plurality of fixed receiving stations located within the geographic area, there being fewer receiving stations than meter reading units with each receiving station including a receiver that receives signals transmitted from between one meter reading unit and one thousand meter reading units and a transmitter that selectively transmits wire radio signals representative of at least a portion of the data generated by at least one meter reading unit; and a central station having at least one receiver to receive signals transmitted from the plurality of receiving stations, a processor that decodes the signal, and a memory that stores data representative of at least a portion of the decoded signals in a data base.

18. In a radio communication network for collecting data generated by a plurality of utility meters located within a geographic area, a method of communicating signals comprising the steps of:

for each of a plurality of meter reading units coupled to a respective utility meter, autonomously transmitting by wireless radio signals representative of at least a portion of the data generated by the meter reading unit for that utility meter;

for each of a plurality of fixed receiving stations located within the geographic area, there being fewer receiving stations than meter reading units with each receiving station, receiving signals transmitted from at least one meter reading unit and selectively transmitting wireless radio signals representative of at least a portion of the data generated by at least one meter reading unit; and receiving signals at a central station transmitted from the plurality of receiving stations, decoding the signals, and storing data representative of at least a portion of the decoded signals in a data base.

19. In a radio communication network for collecting data generated by a plurality of utility meters located within a geographic area, a method of communicating signals comprising the steps of:

for each of a plurality of meter reading units coupled to a respective utility meter, autonomously transmitting by wireless radio signals representative of at least a portion of the data generated by the meter reading unit for that utility meter;

for each of a plurality of fixed receiving stations located within the geographic area, there being fewer receiving stations than meter reading units with each receiving station, receiving signals transmitted from at least one meter reading unit and a selectively transmitting wireless radio signals representative of at least a portion of the data generated by at least one meter reading unit;

for each of a plurality of intermediate stations located within the geographic area, receiving signals transmitted from at least one receiving station and selectively sending signals representative of at least a portion of the data generated by at least one meter reading unit; and receiving signals at a central station transmitted from the plurality of intermediate stations, decoding the signals, and storing data representative of at least a portion of the decoded signals in a data base.

20. In a radio communication network for collecting data generated by a plurality of electrical utility meters located within a geographic area, a method of communicating signals comprising the steps of:

for each of a plurality of meter reading units coupled to a respective utility meter, autonomously transmitting by wireless radio at psuedo-random times and at a power of less than 100 mW and distances of only up to 2 kilometers signals representative of at least a portion of the data generated by the meter reading unit for that utility meter;

for each of a plurality of fixed receiving stations located within the geographic area, there being fewer receiving stations than meter reading units with each receiving station, receiving signals transmitted from at least one meter reading unit and selectively transmitting wireless radio signals representative of at least a portion of the data generated by at least one meter reading unit; and receiving signals at a central station transmitted from the plurality of receiving stations, decoding the signals, and storing data representative of at least a portion of the decoded signals in a data base.

\* \* \* \* \*

UNITED STATES PATENT AND TRADEMARK OFFICE
CERTIFICATE OF CORRECTION

PATENT NO. : 6,653,945 B2
DATED : November 25, 2003
INVENTOR(S) : Johnson et al.

It is certified that error appears in the above-identified patent and that said Letters Patent is hereby corrected as shown below:

<u>Title page,</u>
Item [75], Inventors, correct inventor's name to read -- James J. Murphy --.

<u>Column 19,</u>
Line 36, please change "notes" to -- nodes --.

<u>Column 20,</u>
Line 25, the word "As" should read -- as --.

<u>Column 24,</u>
Line 57, the word "herein" should read -- wherein --.

<u>Column 25,</u>
Line 4, "claim 1" should read -- claim 9 --.

Signed and Sealed this

Thirteenth Day of July, 2004

JON W. DUDAS
*Acting Director of the United States Patent and Trademark Office*